US012633777B2

(12) United States Patent
Naderi et al.

(10) Patent No.: US 12,633,777 B2
(45) Date of Patent: May 19, 2026

(54) PROGRAMMABLE INTELLIGENT SURFACES WITH AI-ENABLED AUTONOMOUS SENSING, CHARGING, COMPUTING, AND NETWORKING

(71) Applicant: Northeastern University, Boston, MA (US)

(72) Inventors: Yousof Naderi, Brookline, MA (US); Kaushik Chowdhury, Needham, MA (US); Ufuk Muncuk, Waltham, MA (US)

(73) Assignee: Northeastern University, Boston, MA (US)

( * ) Notice: Subject to any disclaimer, the term of this patent is extended or adjusted under 35 U.S.C. 154(b) by 44 days.

(21) Appl. No.: 18/718,978

(22) PCT Filed: Dec. 21, 2022

(86) PCT No.: PCT/US2022/053696
§ 371 (c)(1),
(2) Date: Jun. 12, 2024

(87) PCT Pub. No.: WO2023/122201
PCT Pub. Date: Jun. 29, 2023

(65) Prior Publication Data
US 2025/0055321 A1 Feb. 13, 2025

Related U.S. Application Data

(60) Provisional application No. 63/292,700, filed on Dec. 22, 2021.

(51) Int. Cl.
*H02J 50/12* (2016.01)
*H02J 50/00* (2016.01)
(Continued)

(52) U.S. Cl.
CPC ............ *H02J 50/12* (2016.02); *H02J 50/005* (2020.01); *H02J 50/40* (2016.02); *H02J 50/90* (2016.02)

(58) Field of Classification Search
CPC .......... H02J 50/12; H02J 50/005; H02J 50/40; H02J 50/90; H02J 50/402; H01F 38/14
See application file for complete search history.

(56) References Cited

U.S. PATENT DOCUMENTS 4,203,151 A * 5/1980 Baker ................... H02M 7/501
363/43
11,133,714 B1* 9/2021 Boulanger ............ H02J 50/005
(Continued)

FOREIGN PATENT DOCUMENTS

KR 20180076359 A 7/2018
WO 2016010374 A1 1/2016

*Primary Examiner* — Daniel Cavallari
*Assistant Examiner* — Brian K Baxter
(74) *Attorney, Agent, or Firm* — Adams & Reese, LLP

(57) ABSTRACT

Provided herein are programmable intelligent surfaces (PIS) for transmitting power and/or signals to a device positioned on or proximate the surface including at least one resonant unit including a power distribution layer having at least one transmitter coil configured to be energized by a power source and generate an electromagnetic field sized to electrically interact with at least one meta-cell coil of a meta-resonance layer, and the meta-resonance layer extending over the power distribution layer and comprising an array of configurable meta-cells, each including at least one of the meta-cell coils configured to selectively amplify, block, modify, or pass unchanged the electromagnetic field generated by the transmitter coil.

21 Claims, 33 Drawing Sheets

(51) Int. Cl.
    *H02J 50/40*       (2016.01)
    *H02J 50/90*       (2016.01)

(56)             References Cited

U.S. PATENT DOCUMENTS

| | | | |
|---|---|---|---|
| 11,228,212 | B2 * | 1/2022 | Yoon ........................ H02J 50/20 |
| 2014/0062215 | A1 * | 3/2014 | Seo ..................... H01F 27/2804 |
| | | | 307/104 |
| 2016/0204620 | A1 | 7/2016 | Cho |
| 2017/0063432 | A1 * | 3/2017 | Martin ................... H04B 5/266 |
| 2017/0201130 | A1 * | 7/2017 | Park ........................ H02J 50/80 |
| 2018/0269570 | A1 | 9/2018 | Hosseini et al. |
| 2021/0044154 | A1 * | 2/2021 | Sherman ................. H02J 50/50 |
| 2021/0101680 | A1 | 4/2021 | Naderi et al. |
| 2021/0175931 | A1 * | 6/2021 | Choi ........................ H02J 50/80 |
| 2021/0265873 | A1 | 8/2021 | Yoon et al. |
| 2021/0384958 | A1 * | 12/2021 | Denis ..................... H04B 7/145 |
| 2022/0232422 | A1 * | 7/2022 | Dai ........................ H04W 72/21 |
| 2022/0344826 | A1 * | 10/2022 | Chowdhury ............ G06N 3/06 |
| 2023/0327714 | A1 * | 10/2023 | Baligh ................... H04B 7/088 |
| | | | 375/262 |
| 2024/0063665 | A1 * | 2/2024 | Chowdhury ............ H02J 50/10 |
| 2024/0418907 | A1 * | 12/2024 | Hu ......................... H04N 23/69 |
| 2024/0429979 | A1 * | 12/2024 | Dey ....................... H04B 17/14 |
| 2025/0132600 | A1 * | 4/2025 | Mazloum ............... H02J 50/20 |
| 2025/0202454 | A1 * | 6/2025 | Chakraborty ........... H03H 9/13 |

\* cited by examiner (config1-1)

(config2-1)

(config3-1)

(config5-1)

*FIG. 8G*

(config4-1)

*FIG. 8F*

Length(cm)
(config3-2)

Length(cm)
(config4-2)

Length(cm)
(config1-3)

Length(cm)
(config2-3)

Length(cm)
(config3-3)

Length(cm)
(config4-3)

(config5-3)

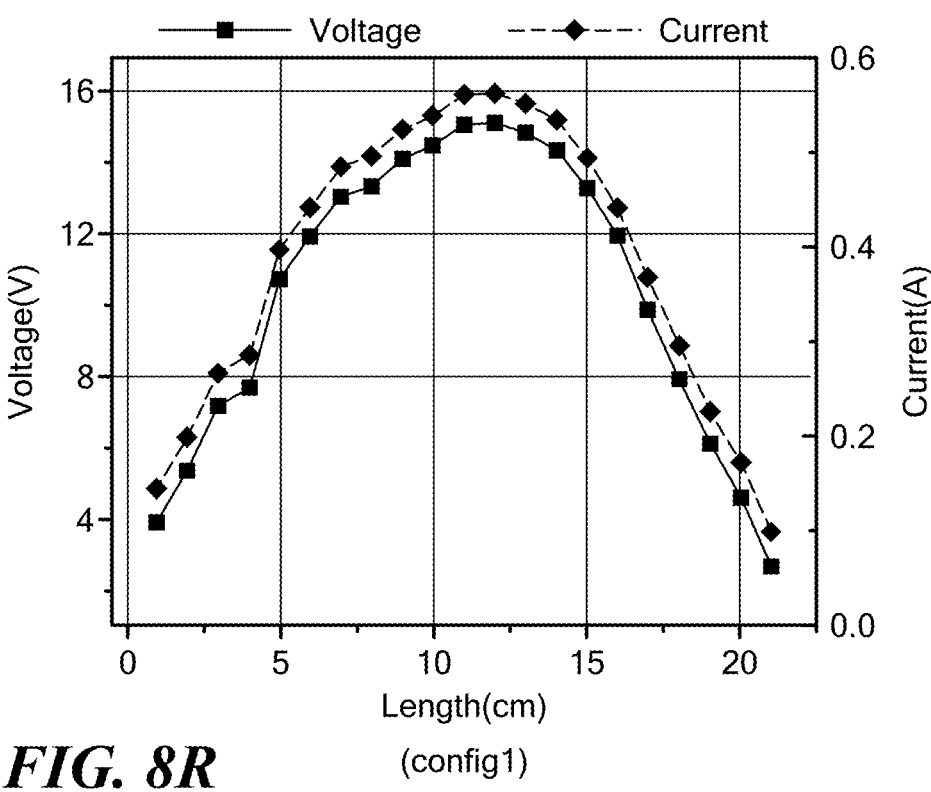
FIG. 8R (config1)
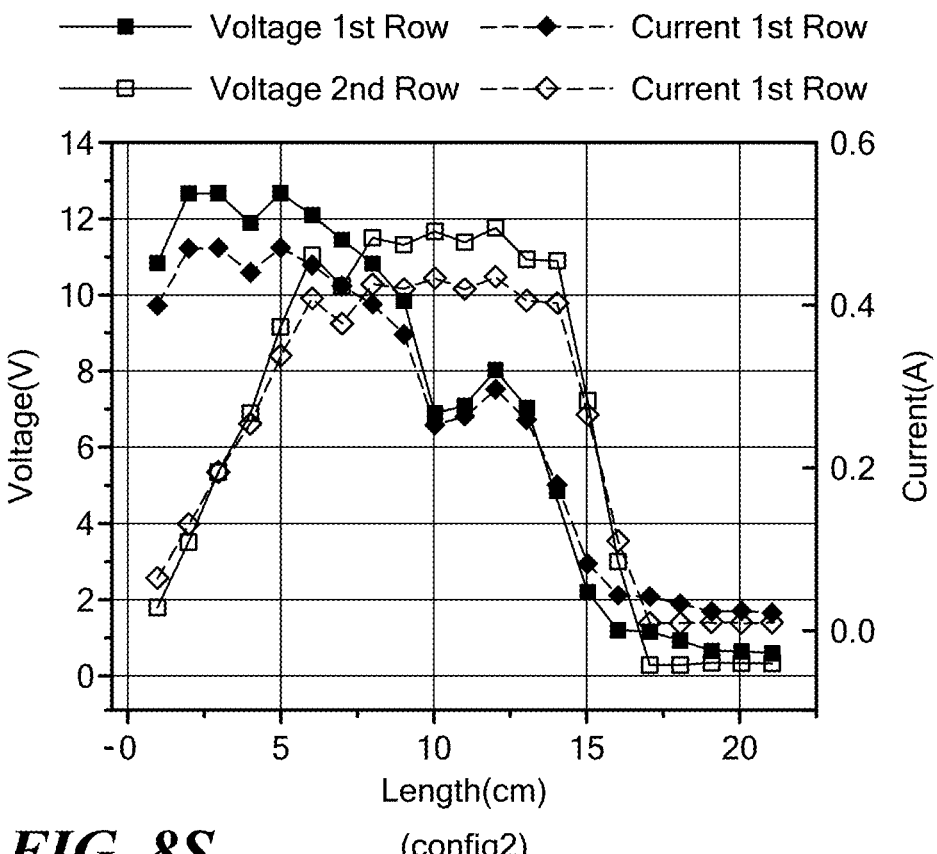
FIG. 8S (config2)

(config3)

(config4)

(config5)

PROGRAMMABLE INTELLIGENT SURFACES WITH AI-ENABLED AUTONOMOUS SENSING, CHARGING, COMPUTING, AND NETWORKING

CROSS REFERENCE TO RELATED APPLICATIONS

This application claims benefit under 35 U.S.C. § 119 (e) of U.S. Provisional Application No. 63/292,700, filed on 22 Dec. 2021, entitled "Programmable Intelligent Surfaces with AI-Enabled Autonomous Sensing, Charging, Computing, and Networking," the entirety of which is incorporated by reference herein.

STATEMENT REGARDING FEDERALLY SPONSORED RESEARCH OR DEVELOPMENT

This invention was made with government support under Grant No. CNS 1452628 awarded by the National Science Foundation. The government has certain rights in the invention.

BACKGROUND

Wireless power transfer for consumer devices, drones, robots and other mobile systems relies on creating an adaptive electromagnetic field that can charge at-a-distance and thereby eliminate the inconvenience of wired charging solutions. Strongly coupled magnetic resonance enables wireless power transfer over a distance of several meters via intermediate resonating coils placed between a transmitter and receiver coil pair. Various related wireless power transfer systems, such as domino resonators, energy hopping, MagMIMO, and metasurface-based systems have been proposed that further extend the transfer distance (to 2 m), increase charging area (to $0.5 \rightarrow 0.75 \text{ m}^2$), and improve the spatial resolution (in cm) of charging. Metasurface, i.e., a surface composed of artificially constructed materials, stands out among these different options. Given the ability to control the incident electromagnetic field propagation, such metasurfaces are now widely used in different areas like nanophotonics, plasmonics, wireless communication in the GHz band and medical applications.

In the context of a wireless power transfer application, prior work involving metasurfaces focuses on increasing the range of wireless power transfer and the charging power available at one specific spot. These methods are not amenable to activating multiple charging spots and do not address the potential safety issues related to the proximity of magnetic fields to human tissue. Additionally, the current inductive and magnetic resonance coil based charging architectures create a power distribution that has a fixed concentric pattern with the maximum intensity of energy field located at the center and gradually decreasing moving radially outwards.

The key challenges associated with conventional wireless power transfer approaches include a lack of flexible power distribution over the surface, blind spots, and magnetic field leakages that can result in interference and human safety issues. Furthermore, in part due to the challenges discussed above, such conventional approaches lack reconfigurable, highly end-to-end efficient power distribution over surfaces and areas accommodating the charging of multiple types and numbers of devices.

SUMMARY

Provided herein are methods and systems for programmable intelligent surfaces (PIS) for transmitting power and/ or signals to a device positioned on or proximate the surface. Described herein is a design and systems level implementation of a magnetic resonance based intelligent surface wireless power transfer system with a novel meta-resonance layer. This layer shapes the magnetic field through it that results in 'meta-resonance'. This phenomenon is key in transforming an existing surface into an intelligent wireless charger for (i) reconfigurable and on-demand energy shaping that can customizable energy hologram and (ii) beamforming to charge multiple devices. The advantages of meta-resonance over conventional methods such as inductive and magnetic resonance charging, distributed RF and magnetic beamforming, and energy hopping lie in its ability to provide high-power delivery with safety guarantees, high end-to-end efficiency, and customized power distribution profile in three dimensions over the surface.

From a systems implementation viewpoint, this is achieved through a power distribution layer and a meta-resonance layer having an array of meta-resonance cells. An experimental setup of the intelligent surface wireless power transfer system was simulated, fabricated, and built. Performance results demonstrate the reconfigurability in the power and energy fields over the whole surface with fine granularity. Specifically, the magnetic field of the experimental setup can be blocked within 2 cm with more than 95% efficiency while the power transfer efficiency can be improved up-to 92.8% by beamforming. In addition, wireless charging in connection with various real-world applications have been demonstrated, including, for example, consumer electronics, industrial tools, battery packs, and medical devices.

In one aspect a programmable intelligent surface (PIS) for transmitting power and/or signals to a device positioned on or proximate the surface is provided. The PIS includes at least one resonant unit. The resonant unit includes a power distribution layer having at least one transmitter coil configured to be energized by a power source and generate an electromagnetic field sized to electrically interact with at least one meta-cell coil of a meta-resonance layer. The resonant unit also includes the meta-resonance layer extending over the power distribution layer and including an array of configurable meta-cells. Each meta-cell includes at least one of the meta-cell coils configured to selectively amplify, block, modify, or pass unchanged the electromagnetic field generated by the transmitter coil.

In some embodiments, the array of meta-cells includes an 8×9 grid of meta-cells. In some embodiments, the PIS also includes an array including a plurality of resonant units. In some embodiments, the power distribution layer of one of the plurality of resonant units is directly energized by the power source and the power distribution layer of each of the other resonant units is energized by energy hopping between the transmitter coils. In some embodiments, the energy hopping includes at least one of induction based hopping, magnetic resonant hopping, or wire connection. In some embodiments, the array of resonant units is a 3×4 grid of resonant units. In some embodiments, each configurable meta-cell of the array of meta-cells is spaced apart by a distance sufficient to reduce magnetic interference between adjoining meta-cells. In some embodiments, the meta-cells are spaced apart by at least 0.5 cm. In some embodiments, the PIS also includes a single-ended primary-inductor converter (SEPIC) pre-regulator electrically connected between the power source and the power distribution layer. In some embodiments, the PIS also includes an amplifier electrically connected between the power source and the power distribution layer. In some embodiments, the PIS also includes an impedance-matching network electrically connected between the power source and the power distribution layer. In some embodiments, in the meta-resonance layer each meta-cell is connected to at least one capacitor bank and a multi-layer power relay network configured to vary an impedance of each respective meta-cell. In some embodiments, the multi-layer power relay network includes a plurality of single-pole single-throw solid-state relays. In some embodiments, the meta-resonance layer also includes a microcontroller for controlling the meta-cells, the capacitor banks, and the multi-layer power relay network.

In some embodiments, the meta-resonance layer also includes at least one additional array of meta-cells extending over the array of meta-cells, each meta-cell of the at least one additional array of meta-cells including at least one additional meta-cell coil configured to selectively amplify, block, modify, or pass unchanged the electromagnetic field generated by the transmitter coil. In some embodiments, the at least one additional meta-cell coil has at least one of a different size or a different shape than the at least one meta-cell coil of the array of meta-cells. In some embodiments, the PIS also includes at least one additional meta-resonance layer, the at least one additional meta-resonance layer comprising an additional array of meta-cells, each including at least one additional meta-cell coil configured to selectively amplify, block, modify, or pass unchanged the electromagnetic field generated by the transmitter coil. In some embodiments, the at least one additional meta-cell coil of the at least one additional meta-resonance layer has at least one of a different size or a different shape than the at least one meta-cell coil of the array of meta-cells. In some embodiments, the PIS also includes at least one additional power distribution layer, the at least one additional power distribution layer including at least one additional transmitter coil configured to be energized by the power source or an additional power source and to generate an additional electromagnetic field. In some embodiments, the at least one additional transmitter coil has at least one of a different size or a different shape than the at least one transmitter coil of the power distribution layer. In some embodiments, each meta-cell is a power cavity resonator.

Additional features and aspects of the technology include the following:

1. A programmable intelligent surface (PIS) for transmitting power and/or signals to a device positioned on or proximate the surface, the PIS comprising:

at least one resonant unit including:

a power distribution layer having at least one transmitter coil configured to be energized by a power source and generate an electromagnetic field sized to electrically interact with at least one meta-cell coil of a meta-resonance layer; and the meta-resonance layer extending over the power distribution layer and comprising an array of configurable meta-cells, each including at least one of the meta-cell coils configured to selectively amplify, block, modify, or pass unchanged the electromagnetic field generated by the transmitter coil.

2. The PIS of feature 1, wherein the array of meta-cells includes an 8×9 grid of meta-cells.

3. The PIS of any of the preceding features, further comprising an array including a plurality of resonant units.

4. The PIS of feature 3, wherein the power distribution layer of one of the plurality of resonant units is directly energized by the power source and the power distribution layer of each of the other resonant units is energized by energy hopping between the transmitter coils.

5. The PIS of feature 4, wherein the energy hopping includes at least one of induction based hopping, magnetic resonant hopping, or wire connection.

6. The PIS of feature 3, wherein the array of resonant units is a 3×4 grid of resonant units.

7. The PIS of any of the preceding features, wherein each configurable meta-cell of the array of meta-cells is spaced apart by a distance sufficient to reduce magnetic interference between adjoining meta-cells.

8 The PIS of feature 7, wherein the meta-cells are spaced apart by at least 0.5 cm.

9. The PIS of any of the preceding features, further comprising a single-ended primary-inductor converter (SEPIC) pre-regulator electrically connected between the power source and the power distribution layer.

10 The PIS of any of the preceding features, further comprising an amplifier electrically connected between the power source and the power distribution layer.

11. The PIS of any of the preceding features, further comprising an impedance-matching network electrically connected between the power source and the power distribution layer.

12. The PIS of any of the preceding features, wherein in the meta-resonance layer each meta-cell is connected to at least one capacitor bank and a multi-layer power relay network configured to vary an impedance of each respective meta-cell.

13. The PIS of feature 12, wherein the multi-layer power relay network includes a plurality of single-pole single-throw solid-state relays.

14. The PIS of feature 13, wherein the meta-resonance layer includes a microcontroller for controlling the meta-cells, the capacitor banks, and the multi-layer power relay network.

15. The PIS of any of the preceding features, wherein the meta-resonance layer includes at least one additional array of meta-cells extending over the array of meta-cells, each meta-cell of the at least one additional array of meta-cells including at least one additional meta-cell coil configured to selectively amplify, block, modify, or pass unchanged the electromagnetic field generated by the transmitter coil.

16. The PIS of feature 15, wherein the at least one additional meta-cell coil has at least one of a different size or a different shape than the at least one meta-cell coil of the array of meta-cells.

17. The PIS of any of the preceding features, further comprising at least one additional meta-resonance layer, the at least one additional meta-resonance layer comprising an additional array of meta-cells, each including at least one additional meta-cell coil configured to selectively amplify, block, modify, or pass unchanged the electromagnetic field generated by the transmitter coil.

18. The PIS of feature 17, wherein the at least one additional meta-cell coil of the at least one additional meta-resonance layer has at least one of a different size or a different shape than the at least one meta-cell coil of the array of meta-cells.

19. The PIS of any of the preceding features, further comprising at least one additional power distribution layer, the at least one additional power distribution layer including at least one additional transmitter coil configured to be energized by the power source or an additional power source and to generate an additional electromagnetic field.

20. The PIS of feature 19, wherein the at least one additional transmitter coil has at least one of a different size or a different shape than the at least one transmitter coil of the power distribution layer.

21. The PIS of any of the preceding features, wherein each meta-cell is a power cavity resonator.

BRIEF DESCRIPTION OF THE DRAWINGS

Embodiments of the present disclosure are described by the way of example with references to the accompanying drawings, which are schematic and are not intended to be drawn to scale. The drawings referenced herein form a part of the specification. Features shown in the drawings are meant as illustrative of only some aspects of the invention.

FIGS. 8M-8Q) provide simulation and experimental results across five different wireless power transfer configurations. As presented, for each of the three groups, config1 shows the power pattern in the meta-resonance layer with an open circuit, config2, config3, and config4 each show the power patterns generated by customization of the meta-resonance layer, and config5 demonstrates a power blocking configuration in the meta-resonance layer, which can be advantageous, for example, in connection with human safety.

FIG. 8R-8V illustrate voltage and current change under different configurations. In FIGS. 8R-8V the voltage and current is obtained from the load connected to the receiver.

DESCRIPTION

Figure 1A:
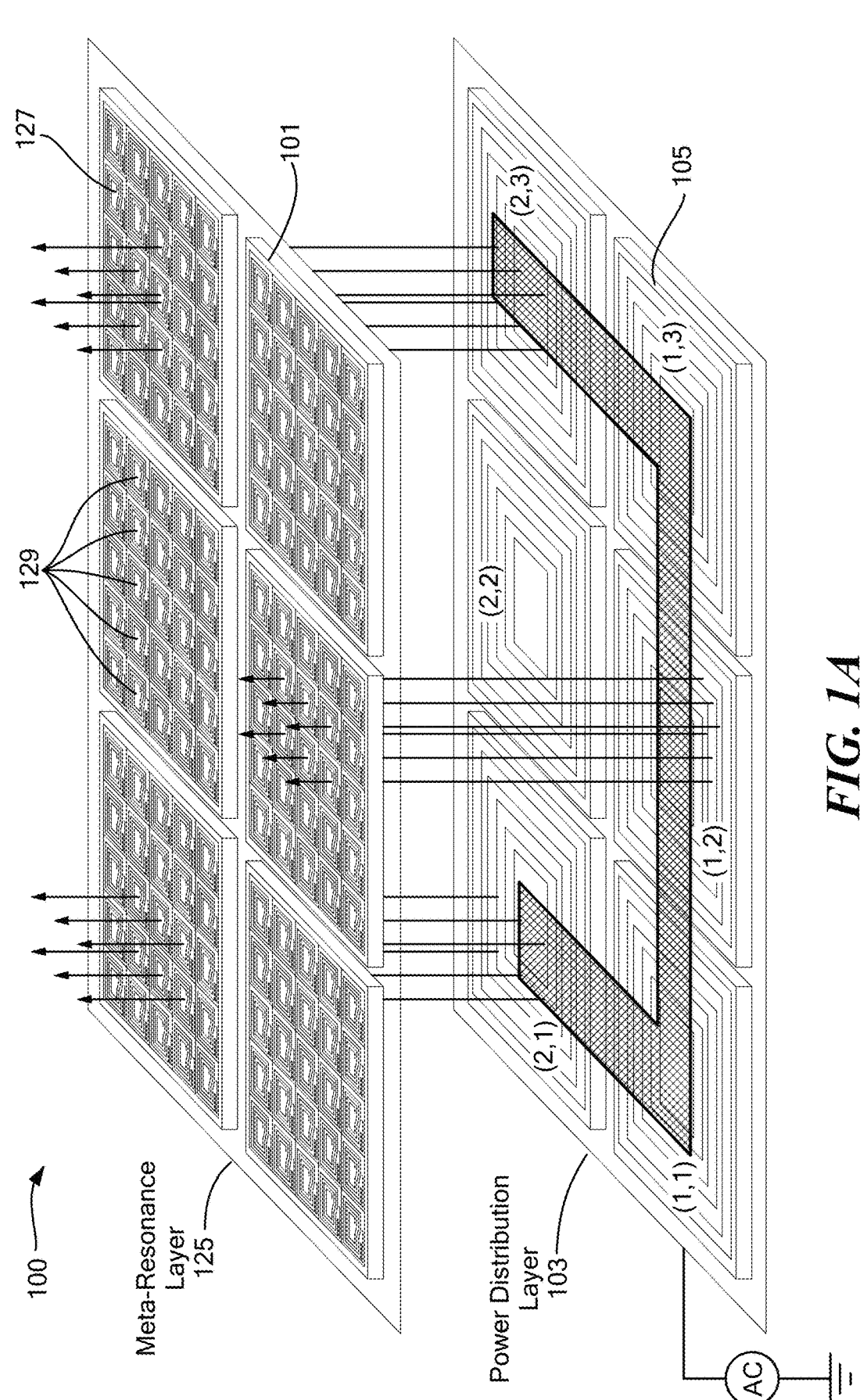
FIG. 1A illustrates a two-layer architecture of a meta-resonant intelligent surface wireless power transfer system composed of an array of meta-resonance units. The power distribution layer provides power distribution with multiple transmitter coils and the top layer is a meta-resonance layer with an array of meta-cells.

In the following detailed description, reference is made in the accompanying drawings, which form a part hereof. The drawings are not to scale or to proportion and the illustrated embodiments described in the detailed description and claims are not meant to be limiting. Other embodiments may be used and/or and other changes may be made without departing from the spirit or scope of present invention.

This disclosure introduces programmable intelligent surface wireless power transfer system. The intelligent surfaces presented herein provide first-of-a-kind hardware-software capability that transforms an existing, ordinary surface into a programmable and intelligent surface and performs various contactless sensing, computing, and networking tasks distributed over its entire 2-D planar and/or 3-D surface dimension. Such intelligent surfaces will enable businesses in workplaces, cities, and industrial environments to incorporate contact-less interactive services with a combination of the following features: (i) real-time tracking and localization of multiple devices over multiple surfaces, (ii) seamless and contactless wireless charging of multiple types and numbers of electronic devices at the same time and placed in any location over the surface, (iii) boosting the strength of wireless signals such as LTE, and Wi-Fi by acting as repeaters, and (iv) shaping the reflection environment in enclosed spaces, and thus allowing assured reach and connectivity. Additionally, intelligent surface eliminates the customer pains of (i) manual tracking and management of devices, (ii) purchasing, installing, and maintaining separate hardware such as multiple charger adapters, multiple power cords, camera, radar, RFID based trackers, and various financial card readers. Intelligent surface wireless power transfer which is a system and architecture for transferring existing surfaces into intelligent wireless charger with reconfigurable and on-demand energy shaping and beamforming to charge multiple devices. Conventional methods such as inductive and magnetic resonance charging, distributed RF and magnetic beamforming, and energy hopping are limited in terms of providing high-power delivery with safety guarantees, high end-to-end efficiency, and customized power distribution over the surface.

By contrast, the intelligent surfaces presented herein can advantageously efficiently create customized holograms of electromagnetic energy fields over a large surface with novel multi-layer reconfigurable architecture. In general, the system includes at least two layers, a power distribution layer and a meta-resonance layer including an array of meta-cells. In accordance with various embodiments, up to n-layers may be provided, with any number and/or layering arrangement of power distribution layers and meta-resonance layers to provide a desired reconfigurability and control over electromagnetic fields generated by the intelligent surface.

This disclosure introduces intelligent surface wireless power transfer providing a first-of-its-kind system that enables creation of fully reconfigurable energy patterns over a surface by utilizing a novel architecture and shaping the energy fields in in the form of granular power amplification, passing, modification, and blocking. Modification of the energy field, as used herein, refers to any change to any characteristic of the energy field (whether the field is transmitting power, data/information, or both) including, for example, shape, power, frequency, phase, amplitude, directionality, etc. The intelligent surface wireless power transfer architecture has at least two layers. In such a two layer configuration, a first layer is a power distribution layer and a second layer is a meta-resonance control layer.

The power layer is an array of transmitter coil resonators where the power propagates to different resonators via energy hopping. In general, only one power amplifier, called the source transmitter, is connected to one transmitter coil. The rest of the transmitter coils get power from the source transmitter through the magnetic resonant mutual coupling between adjacent transmitters. However, in some embodiments, multiple source transmitters can be connected to multiple transmitter coils. In addition, for embodiments having multiple power distribution layers, a single source transmitter may be connected to all of the power distribution layers, a different source transmitter may be connected to each of the power distribution layers, and/or multiple source transmitters may be connected to one (or more) of the power distribution layers as appropriate for the desired power distribution characteristics.

On the other hand, each control layer (meta-resonance layer) includes a configurable array of meta-cell coils (also referred to as "meta-cells"), where each meta-cell acts as a power cavity resonator for modifying the energy field that passes through it. In some embodiments, the meta-resonance layer can include a single, two-dimensional array of meta-cell coils layered over the power distribution layer. In general, by controlling impedance of the transmitter coils and the meta-cell coils, interactions between the various coils can be targeted to produce In some embodiments, rather than a two-dimensional array of meta-cell coils, a single meta-resonance layer can include multiple vertically stacked arrays of meta-cell coils layered atop one another. In such embodiments, the arrays of meta-cell coils may include coils having different sizes and/or shapes to produce different resonant properties and/or to create misalignment with the meta-cell coils of another of the meta-cell coil arrays to produce partial overlap between the meta-cell coils, thereby providing greater control over location, characteristics, and shape of the electromagnetic fields produced by the meta-resonance layer.

Furthermore, in some embodiments, multiple meta-resonance layers, each having one or more meta-cell coil arrays, whether having coils of a similar size and shape or different sizes and/or shapes to produce different resonant properties and/or to create misalignment with the meta-cell coils of another of the meta-resonance layers to produce partial overlap between the meta-cell coils of the different meta-resonance layers, thereby providing greater control over location, characteristics, and shape of the electromagnetic fields produced by the meta-resonance layers and the overall intelligent surface wireless power transfer system.

In addition, in some embodiments, the one or more meta-resonance layers can be provided in any relation to the one or more power distribution layers. For example, in some embodiments a power distribution layer can be provided at a base of the overall layered intelligent surface wireless power transfer system and can unidirectionally project an electromagnetic field through one or more meta-resonance layers. Alternatively, in some embodiments, a power distribution layer can be sandwiched between two or more meta-resonance layers and can bidirectionally project an electromagnetic field through both. In other embodiments, one or more additional power distribution layers can be added as appropriate for the desired power distribution characteristics of the intelligent surface wireless power transfer system.

In some embodiments, basic structures of the power distribution layer and the meta-resonant layer can share some similar components. In particular, both may include an array of coils and a controller device (e.g., an integrated chip or microcontroller) and accompanying AI or other control software for dynamically controlling the impedance or other characteristics of each coil. Thus, in some embodiments, any layer can be converted from power distribution network to meta-resonant layer so long as layer-specific circuitry (described below) such as capacitor banks, multi-layer power relay networks, impedance matching networks, amplifiers, pre-regulators, and power sources can be connected and disconnected from those base components as needed.

This novel meta-resonance layer advantageously provides safety, high end-to-end efficiency, and power amplification for a high-performance and practical surface-based wireless charging system. Below, this disclosure describes the physical theory behind intelligent surfaces, extensive simulation and experimental results, along with real-world charging applications.

Although layers and objects are referred to herein as "top" and "bottom", these terms do not limit orientation of the intelligent surface. Rather, as used herein, "top" refers to a layer or object closer to a surface on or proximate which a device to be charged is to be placed during use. Additionally, as used herein, "bottom" refers to a layer or object having at least one layer or object between it and a surface on or proximate which a device to be charged is to be placed during use.

Meta-Resonant Intelligent Surface Wireless Power Transfer System Architecture

Experimental setups of the intelligent surface wireless power transfer system, as described in detail herein, have been simulated, fabricated, and built for a two-layer, 2-D case. The performance results demonstrate the power and energy field over the whole surface is reconfigurable with fine granularity, the magnetic field can be blocked within 2 cm with more than 95% efficiency, and the power transfer efficiency can be improved up-to 92.8% by beamforming. Various real-world charging applications such consumer electronics, industrial tool, battery pack, and medical device wireless charging have been demonstrated. In that context, the drawings and descriptions below refer to such two-layer, 2-D configurations.

However, intelligent surface wireless power transfer systems as described herein can include any number of layers in any layered arrangement, each layer having any number of arrays of differently sized and/or shaped transmitter coils and/or meta-cells (e.g., multiple meta-resonance layers and/ or multiple power distribution layers having any arrangement of top, bottom, and intermediate layers).

Figure 1B:
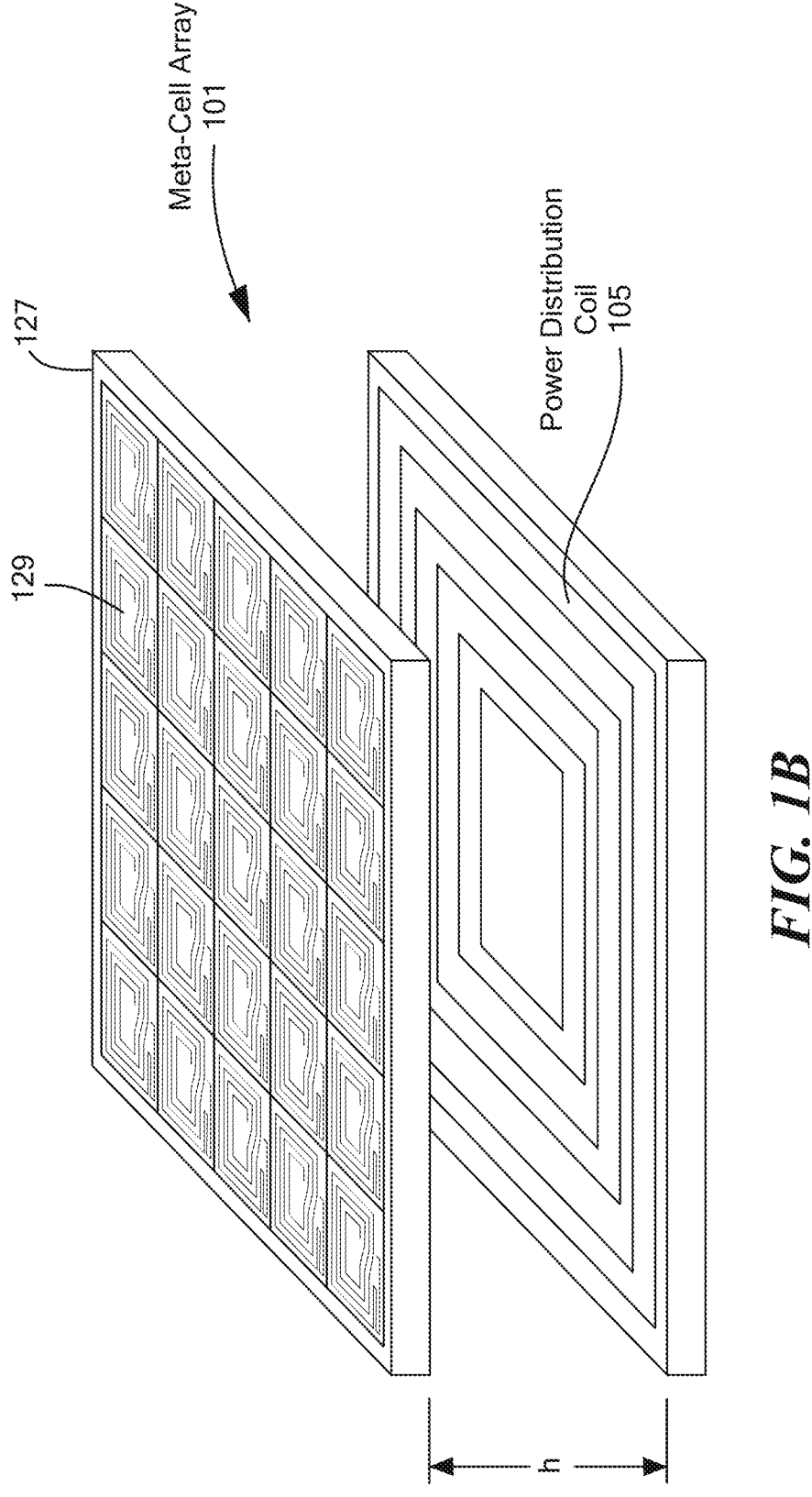
FIG. 1B illustrates a two-layer architecture of a single meta-resonance unit with one transmitter coil at bottom and meta-cell array at top.
Figure 1C:
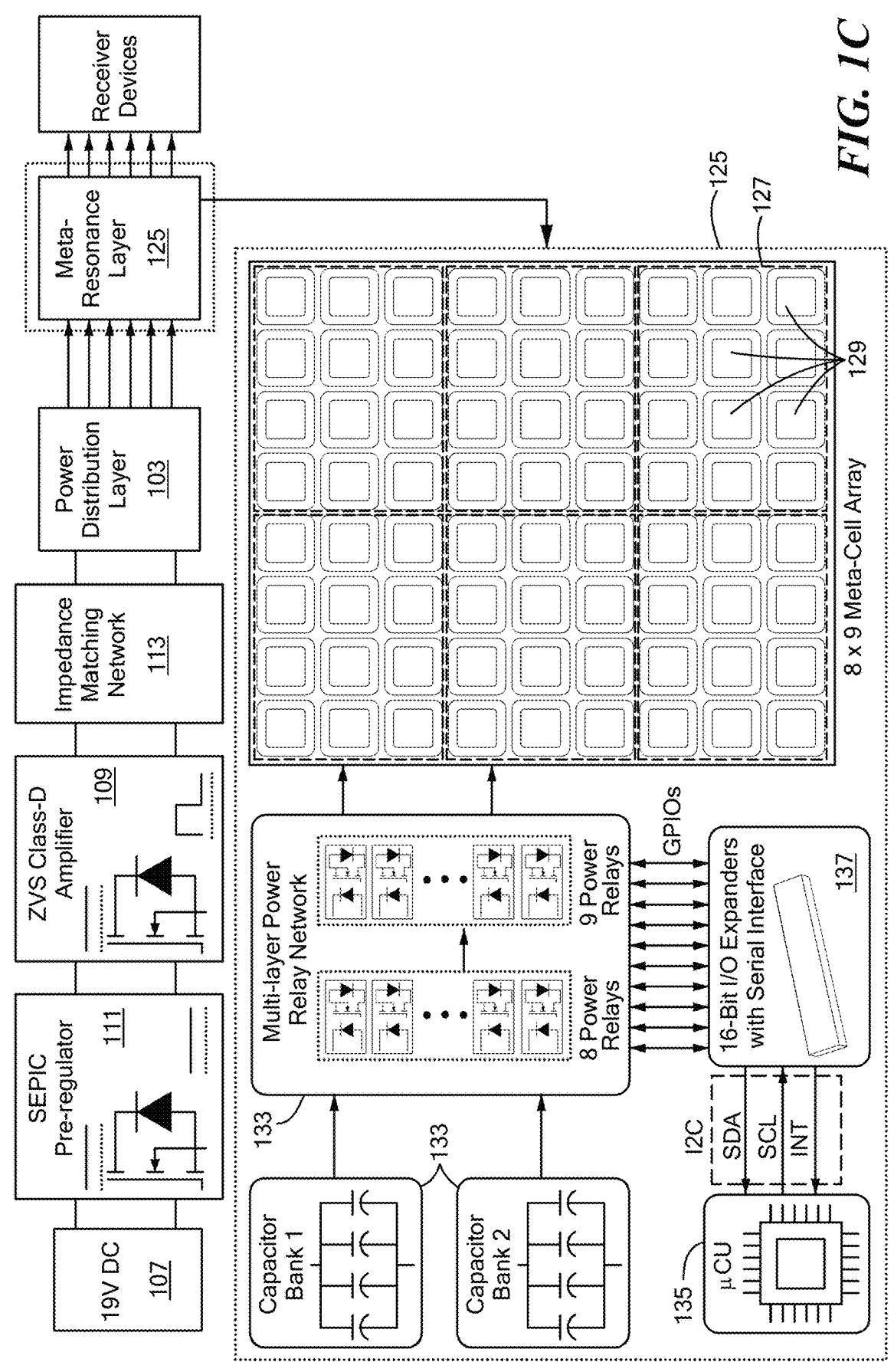
FIG. 1C illustrates a schematic block diagram of a two-layer architecture of the intelligent surface wireless power transfer system of FIG. 1A.

Referring now to FIGS. 1A-1C, an overview of an embodiment of an overall meta-resonant intelligent surface wireless power transfer system 100 having two layers and comprising an array of meta-resonance units 101 is shown. Referring first to FIG. 1A, the power flows via energy hopping between transmitter coils 105 at the power distribution layer 103 (bottom) over different paths. The specific routing path for the power relay is activated by choosing impedances of the power distribution layer 103 transmitter coils 105. Furthermore, the power passes through the array 127 of meta-cell coils 129 in the meta-resonance layer 125 (upper), where it can be (i) amplified, (ii) passed through without any change, or (iii) blocked (shown with longer, shorter and no lines, respectively). In addition, the power (energy field) can be modified as discussed above.

FIG. 1B shows one meta-resonance unit 101 for the wireless power transfer setup, where "h" is the gap separation between power distribution 103 and meta-resonance 125 layers. As also explained below with reference to FIG. 4, in an experimental prototype, the transmitter coil 105 is fabricated on FR4 material, with size 15 cm×22 cm, the measured inductance is 4.6 μH, and the quality factor is 335. The meta-cell 129 is fabricated on FR4 material, with 4.5 cm×5 cm, the measured inductance is 0.388 μH, and the quality factor is 165.

FIG. 1C shows a block diagram of the meta-resonant intelligent surface wireless power transfer system 100 designed with the goal of at-scale and low-cost implementation. The power distribution layer 103 and/or the meta-resonant intelligent surface wireless power transfer system 100 more generally, can include a DC power supply 107 for powering a power amplifier 109. In some embodiments, the power layer also includes a pre-regulator 111 and an impedance matching network 113 to maximize power delivery from the power amplifier 109 to the transmitter coils 105. As also explained below with reference to FIG. 6, the power amplifier, in the experimental prototype the power amplifier 109 can include a zero-voltage switching (ZVS) class-D power amplifier that operates at 6.78 MHz. The power amplifier 109 can be powered by a 19V DC power supply 107 with a single-ended primary-inductor converter (SEPIC) pre-regulator 111. The impedance matching network 113 was configured to provide the maximum power delivery from the ZVS power amplifier 109 to the transmitter coils 105.

In the meta-resonance layer, a meta-cell array 127, in which a plurality of meta-cells 129 are placed in a grid, is used. For example, as shown in FIGS. 1A and 1C, 72 meta-cells are placed in an 8-9 grid forming the meta-cell array 127. Each meta-cell 129 is separated with a spacing sufficient to minimize magnetic interference between neighboring meta-cells 129. In some embodiments, the spacing between meta-cells 129 can be a minimum of about 0.5 cm. Furthermore, each meta-cell 129 can be connected to capacitor banks 131 configured to vary the impedance of the corresponding meta-cell 129 via a multi-layer power relay network 133. For example, in the experimental prototype, an Omron G3VM-101CR single-pole single-throw solid-state relay with high isolation between switch input and outputs, and low insertion loss was used as an element of the multi-layer power relay network 133. The solid-state relays establish a serial electrical connection between each meta-cell coil 129 that is usually open-circuit and the capacitors 131 to create a closed-loop circuit configuration to resonate the meta-cell coil 129 and control coupling between the power distribution layer 103 and meta-resonance layer 125, and then shape the energy field by allowing power amplification, modification, pass-through, and/or blocking as and where needed. A microcontroller (μCU) 135 orchestrates all components in the meta-resonance layer 125 and also controls I/O expanders 137 (e.g., 16-Bit I/O expanders via I2C communication as shown) to establish a connection between each meta-cell 129 and capacitor bank 131 through the power relay network 133 in order to customize energy patterns over the surface. The customized energy pattern over surface of meta-cell array can be created by tuning the capacitance of meta-cell while the power is passing through to block, amplify, modify, or just pass the power based on the its capacitance value.

Theory of Holographic Wireless Power Transfer

Figure 2A:
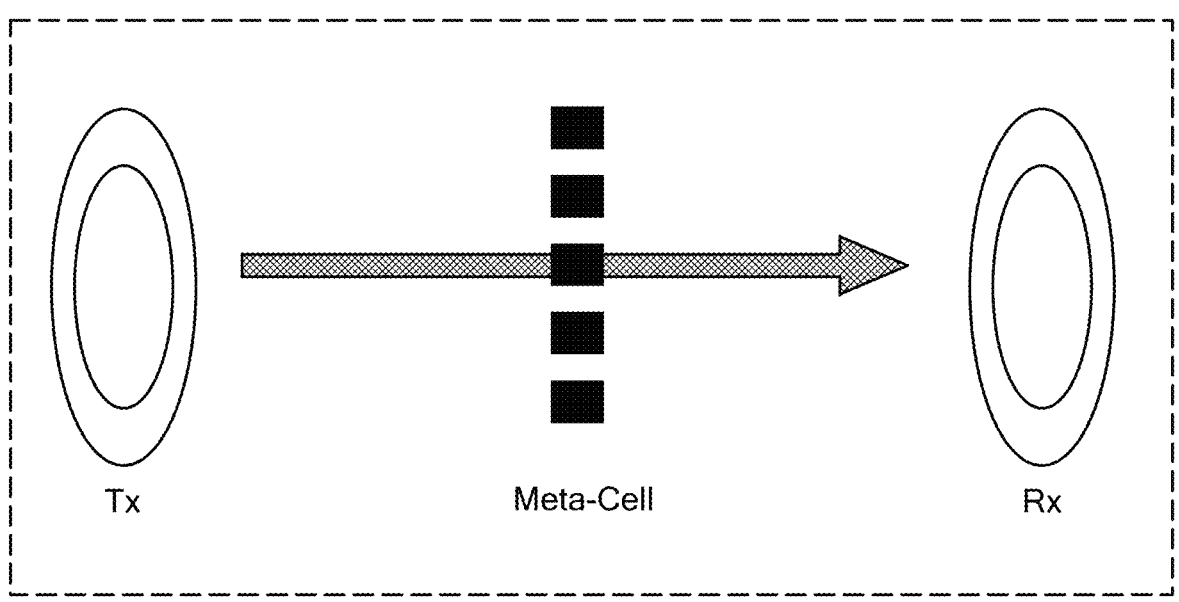
FIG. 2A illustrates a theoretical model of an intelligent surface wireless power transfer system having a meta-cell set as open voltage without coupling and no capacitor.
Figure 2B:
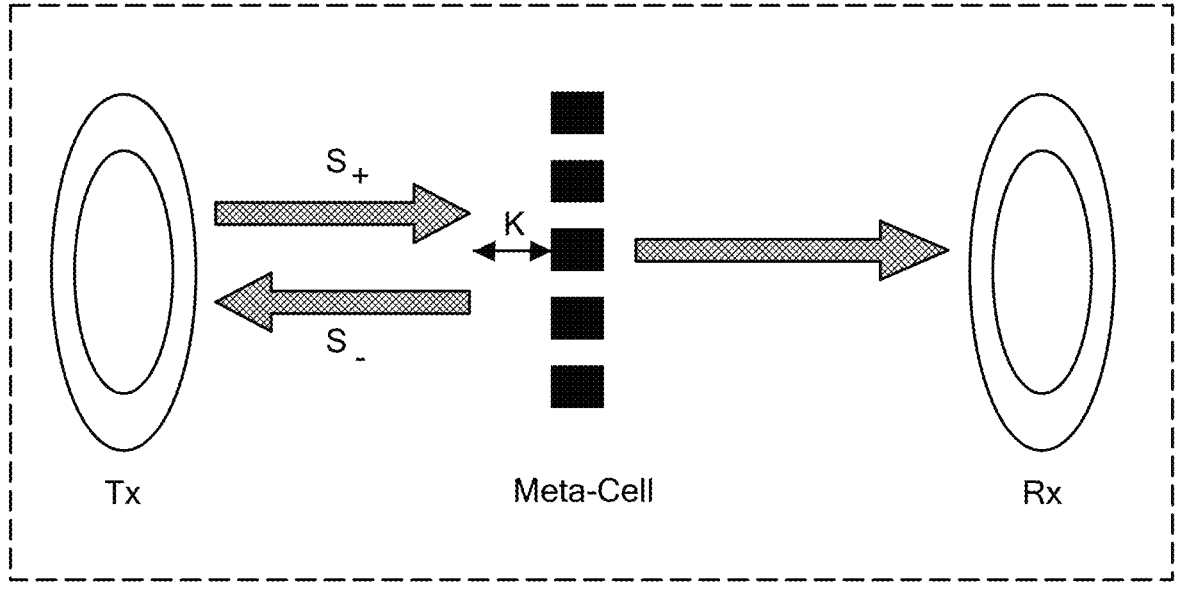
FIG. 2B illustrates a theoretical model of an intelligent surface wireless power transfer system having a meta-cell set as a closed circuit with coupling and a connected capacitor.

This section describes the theory of holographic wireless power transfer, studying two cases to describe the functionality and theory of the meta-resonance layer 125. The first case involves setting a meta-cell coil to open circuit without connecting to a capacitor, as shown in FIG. 2A. The second case involves each meta-cell being closed circuit with connected capacitors, as shown in FIG. 2B. In the first case, the meta-cell with open circuit has negligible interference or impact on the power transfer from the transmitter to receiver coils due to three factors: 1) a relative low working frequency of 6.78 MHz, 2) large gap-distance (1 cm) of two ends in each meta-cell, 3) low power application of less than 30 W. Thus, the system is similar to the case without any meta-resonance layer, i.e., same as conventional power transfer with one transmitter and one receiver.

In the second case, the meta-cell is closed circuit with a connected capacitor. Thus, the power from the transmitter is first transferred to each meta-cell with magnetic resonant coupling. Then, the power in each meta-cell is transferred to the receiver coil. During the electromagnetic energy propagation, each meta-cell can control and impact a part of energy from the transmitter coil, which then impacts the power delivery to the receiver. Accordingly, an array of meta-cells between the transmitter coil and receiver coil can shape and control the energy pattern with fine granularity. In this model, as shown in FIG. 2B, κ determines the coupling rate between the power (wave) from the transmitter coil and the meta-cell. This mutual coupling between transmitter and meta-cell is a function of distance, coil alignment and the relative orientation angle between the two resonators. The power transfer optimization can be explained by wave transmission optimization.

As shown in FIG. 2B, each square block represents one meta-cell, which can be depicted as a simple LC circuit, L and C are the inductance and capacitance of the meta-cell. Assuming continuous energy circulating in lossless LC circuit, the transient response of voltage (v(t)) and current (i(t)) can be represented as:

$$v(t) = L\frac{di}{dt}, \; i(t) = -C\frac{dv}{dt} \tag{1}$$

combining these two equations, produces:

$$\frac{d^2v}{dt^2} + \omega_0^2 v = 0, \; \omega_0^2 = \frac{1}{LC} \tag{2}$$

and the time-dependent solution of voltage and current are:

$$v(t) = |V|\cos(\omega_0 t + \phi), \; i(t) = \sqrt{\frac{C}{L}}\,|V|\sin(\omega_0 t + \phi) \tag{3}$$

here, |V| is the peak amplitude of the voltage in the LC circuit, and $\phi$ is the phase change of voltage and current. However, the above equations are two coupled first-order differential equations, which increases the complexity of calculating the reflection coefficient. Here, the complex variables a that include two uncoupled first-order differential equations are defined, expressed as:

$$a = \sqrt{\frac{C}{2}}\left(v + j\sqrt{\frac{L}{C}}\,i\right) \tag{4}$$

Substitute v(t) and i(t) of equation 4 with equation 3 and, in the steady state, one can obtain:

$$a = \sqrt{\frac{C}{2}}\,[|V|\cos(\omega_0 t + \phi) + j|V|\sin(\omega_0 t + \phi)] = \sqrt{\frac{C}{2}}\,Ve^{j\omega_0 t} \tag{5}$$

Then, a(t) has the dependence $e^{j\omega_0 t}$, and the energy inside this circuit can be obtained:

$$|a|^2 = \frac{C}{2}|V|^2 \tag{6}$$

Hence, the complex variable a is the mode amplitude of the lossless LC circuit, due to the dependence of $e^{j\omega_0 t}$, the resonant mode of the energy circulating in lossless LC circuit can be fully described by equation 7:

$$\frac{da}{dt} = j\omega_0 a \tag{7}$$

If the circuit is lossy, equation 7 is modified as:

$$\frac{da}{dt} = j\omega_0 a - \left(\frac{1}{\tau_0} + \frac{1}{\tau_e}\right)a \tag{8}$$

where $$\frac{1}{\tau_0} \text{ and } \frac{1}{\tau_e}$$

are the decay rate due to the loss the radiation rate. As shown in eq. 2, meta-cells get extra power from transmitters with incident energy wave (amplitude $S_+$). Without loss of generality, consider $S_+(x, y)$ as $S_+$, where (x,y) is a given location on the surface. Given the incident energy wave ($S_+$) with coupling rate x, equation 8 is modified as:

$$\frac{da}{dt} = j\omega_0 a - \left(\frac{1}{\tau_0} + \frac{1}{\tau_e}\right)a + xS_+ \tag{9}$$

Here, the incident energy wave come from the transmitter source with working frequency $\omega$, $S_+ \propto e^{j\omega_0 t}$ with applying perturbation. Thus, at steady state (working frequency won't change at meta-cell), it can be found by solving equation 9:

$$a = \frac{xS_+}{j\left(\omega - \omega_0 + \left[\frac{1}{\tau_0} + \frac{1}{\tau_e}\right]\right)} \tag{10}$$

Next, under the consideration of $$\frac{1}{\tau_0},$$

the functional relation between coupling rate and the radiation rate are calculated based on the theorem of energy conservation:

$$\frac{d}{dt}|a|^2 = -\frac{2}{\tau_e}|a|^2 = -|S_-|^2, \; x = \sqrt{\frac{2}{\tau_e}} \tag{11}$$

As shown in FIG. 2B, the incident energy wave $S_+$ will have reflected energy wave $S_-$ after passing through a meta-cell, and it is easy to get that:

$$S_- = -S_+ + xa \tag{12}$$

The power ratio between the delivered power to the devices and the power passing/entering into the meta-cell from source resonator is proportional to the reflection coefficient, defined as the ratio between $S_+$ and $S_+$. Then, the power reflection coefficient of each meta-cell in the steady is expressed as:

$$\eta = \left|\frac{S_-}{S_+}\right|^2 = \left|\frac{x^2}{j(\omega - \omega_0) + \frac{1}{\tau_0} + \frac{1}{\tau_e}} - 1\right|^2 \tag{13}$$

Figure 3:
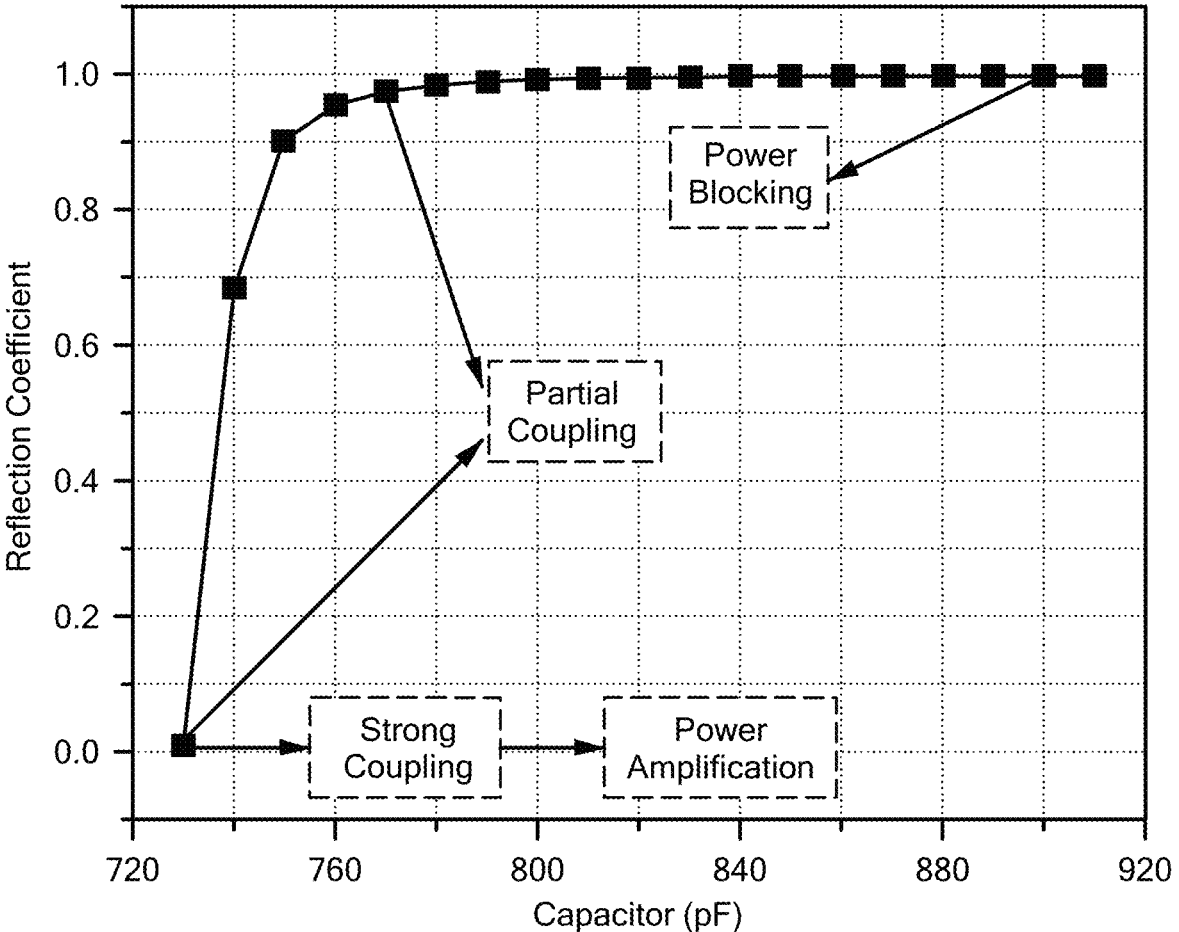
FIG. 3 illustrates a plot of reflection coefficient versus connected capacitance.

For the magnetic resonance based wireless power transfer, $$\frac{1}{\tau_0} = \frac{1}{\tau_e} = \omega/2Q$$

are considered, Q is the quality factor of the meta-cell. Accordingly, the power reflection is only the function of the self-resonant frequency $\omega_0 = 1/\sqrt{LC}$. The capacitance value C is the only variable that is reconfigurable during the operation of the wireless power transfer. FIG. 3 demonstrates the reflection coefficient change with different value of connected capacitor, where it has range [0,1].

Based on reflection coefficient range, the energy transmission performance can be classified strong coupling ($(\eta=0)$) and partial coupling ($0<\eta<1$). In the case of strong coupling ($\eta=0$), each meta-cell acts as a resonator relay, maximizing the power transfer efficiency between transmitter and devices. In the case of partial coupling ($0<\eta<1$) the transmitted power is reflected back with different scales. In practical application, the reflection coefficient with $\eta>0.98$ is considered safe to the human tissue, which is the power blocking via reflecting all of the energy and no power passes through the resonator.

By analyzing equation 13 it is determined that the reflection coefficient is a function of the parameters $\varkappa$, $\tau_0$, $\tau_e$, $\omega$, $\omega_0$. These parameters are independent with the location over the meta-cell surface, which proves that the energy transmission efficiency is location independent. However, the input power from the transmitter to the meta-cell is location dependent $P_T(x, y)$, which results in the power delivered to the receiver is location dependent $P_{mc}(x, y)$, expressed as:

$$P_{mc}(x, y) = (1 - \eta) P_T(x, y), \; P_T(x, y) = |S_+(x, y)|^2 \qquad (14)$$

With equation 14, the received power distribution at any position over the meta-cell layer can be obtained given the input power $P_T(x, y)$. In this work, strong coupling is utilized with $\eta=0$ and partial coupling with $\eta>0.98$ to amplify and block the power delivery, respectively. Thus, given the reflection coefficiency of meta-cell, different delivery modes can be realized such the power amplifying, power blocking and normal pass-through of power, all by tuning the connected capacitors for each meta-cell.

Performance Analysis of Meta-Resonant Intelligent Surface Wireless Power Transfer System In this section, extensive simulation and experimental results are provided on a real-time meta-resonant intelligent surface wireless power transfer system. In particular, the fabricated circuit hardware, transmitter coil, reference coil, meta-cell, receiver coil, the customized receiver with different voltage output, and the class D amplifier are shown. Second, the performance of an individual meta-resonance unit is studied and then a large meta-resonance surface including multiple such units is built. For each case, the performance results are presented in the form of a COMSOL simulation and experimentally observed magnetic field distribution obtained via oscilloscope and the received power on the load (resistor) measured by multimeter are also presented.

Multiple real-world charging applications are then demonstrated including for various devices such as tablets, phones, blood pressure monitors, portable batteries, and power banks all charging on such a meta-resonance surface.

A. System Design and Fabrication

Figure 4:
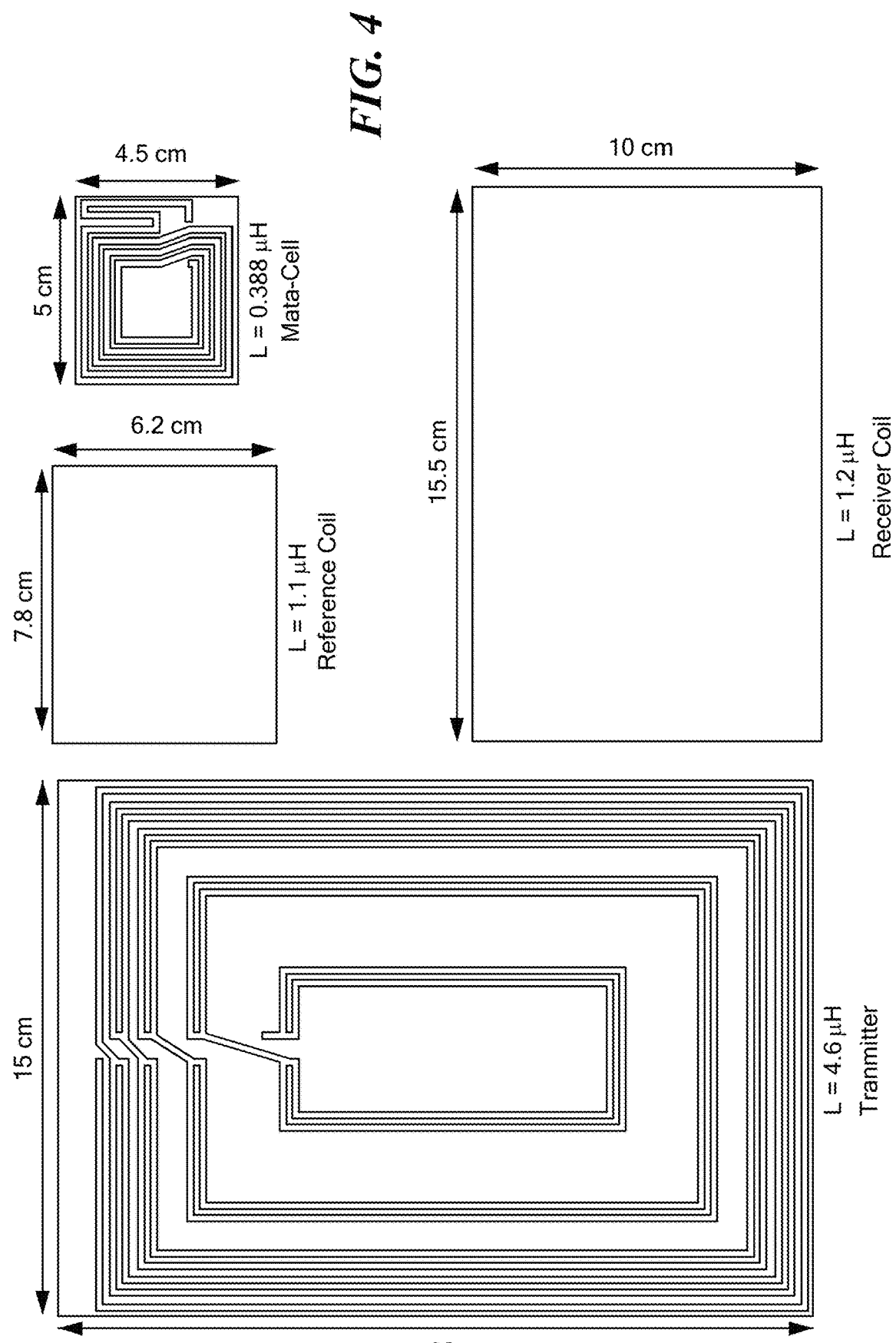
FIG. 4 illustrates fabricated coils for various components used in connection with an experimental prototype. The components include a transmitter at a power distribution layer, a reference coil for voltage and power measurement, a meta-cell at meta-resonance layer, and a receiver coil for power measurement at multiple meta-resonance units.

Coils, including transmitter coils in the power distribution layer, meta-cells in the meta-resonance layer, reference coils, and receiver coils were designed and fabricated using commercial PCB design software EAGLE. FIG. 4, shows the fabricated coil used in the experiments.

Figure 6:
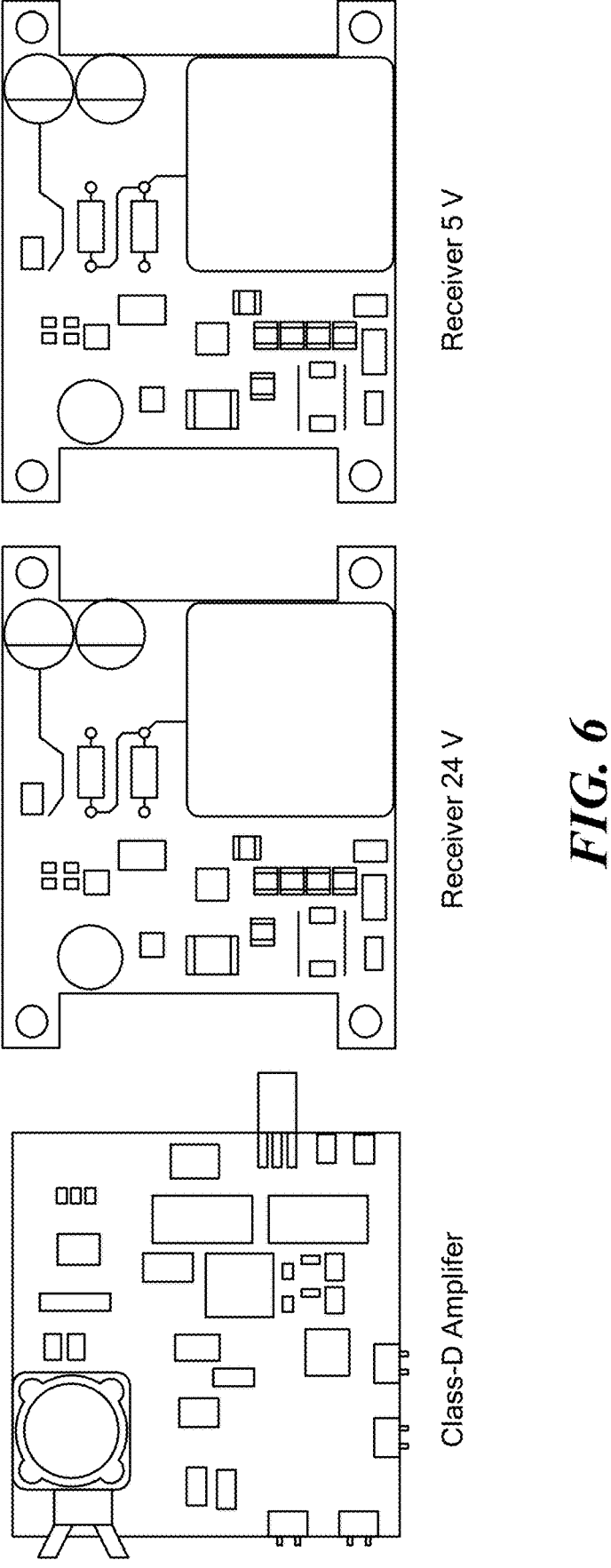
FIG. 6 illustrates components used in connection with the experimental prototype. In particular, a class-D amplifier, a 24V receiver, and a 5V receiver are shown.

The transmitter coil used at the power distribution layer has dimension 22 cm×15 cm with inductance L=4.6 µH. The reference coil is of size 7.8 cm×6.2 cm with inductance L=1.1 µH and is fabricated for two usages. The first usage is to measure the voltage through meta-resonance layer with a coil as open circuit, where the corresponding experiment is conducted for both individual meta-resonance units and multiple meta-resonance units. The reference coil and oscilloscope are serially connected as a close circuit during the measurement. The input resistance of the oscilloscope is 1MΩ, which provides high accuracy in measuring the open-circuit voltage of the reference coil. The measurement is repeated 20 times for each trial to accurately measure the open-circuit voltage of the reference coil. The second usage is to measure the received power to the load in the experiment of an individual meta-resonance unit. The reference coil is connected to the receivers, unlike the first usage measurement, as shown in FIG. 6. An impedance matching network is designed to accurately ensure the maximum power transfer between the reference coil and the rectifier circuitry at receivers. A power resistor that can keep its resistance identical with up to 100 W of its power is connected to the receiver's output as load. A precision multimeter with more than 99% of accuracy is used to measure the voltage of the load. The measurement is also repeated 20 times for each test trial as the first experimental setup. In addition, the meta-cell coil for the cell array of the meta-resonance layer is of size 5 cm×4.5 cm and inductance L=0.388 µH. Last, the receiver coil in FIG. 4 is used to measure the received power of the load in the experiment involving multiple meta-resonance units for charging phone, tablet, medical devices, battery banks and the power-tool battery.

Figure 5:
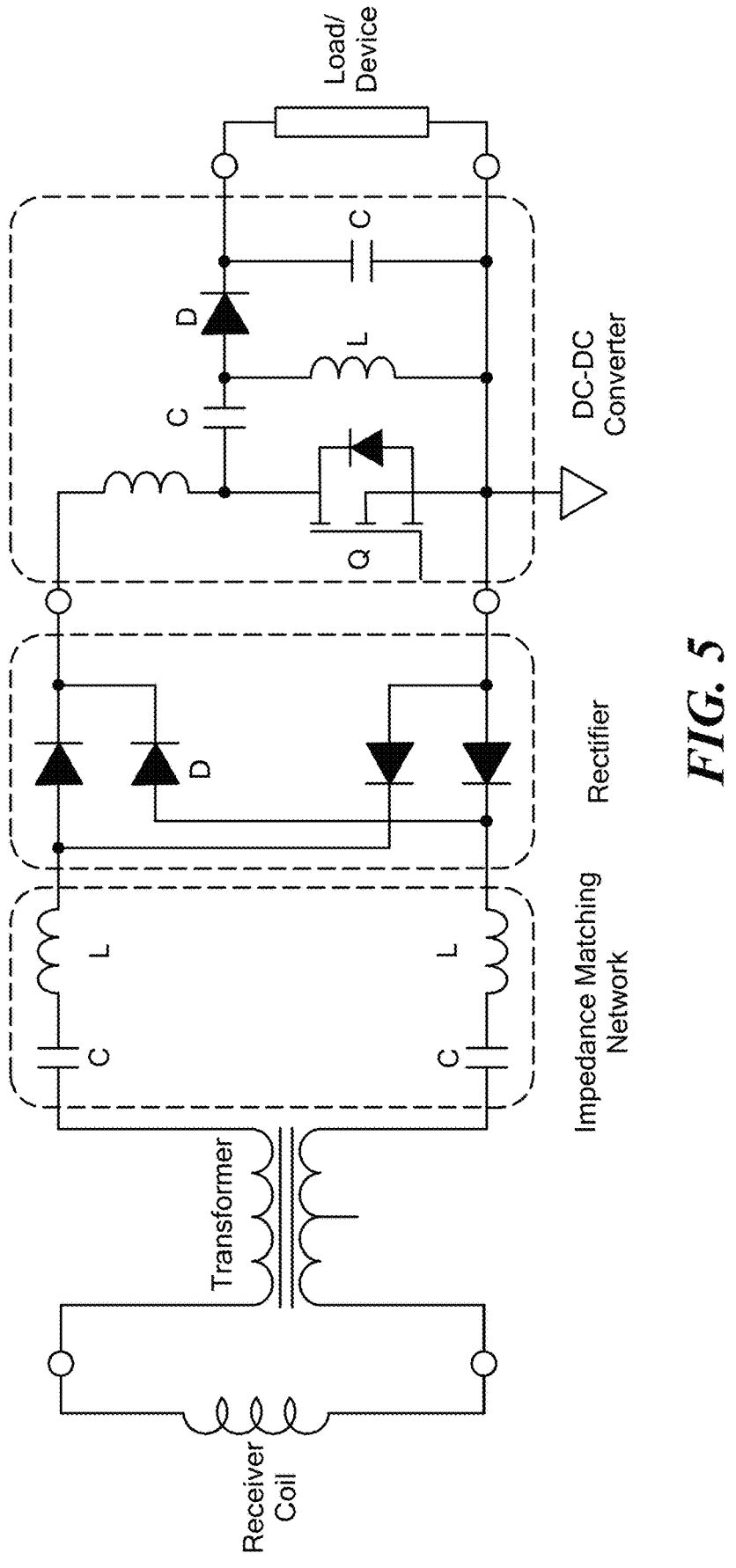
FIG. 5 illustrates a circuit schematic for a power receiver of the intelligent surface wireless power transfer system.

The receiver power management circuit was designed as shown in FIG. 5 with three core parts: the impedance matching, rectifier, and customized DC-DC converter with different output voltage, such as the 5V output for iPad and iPhone charging applications.

FIG. 6 shows the Class-D power amplifier operating at 6.78 MHz, and the designed receivers with different output voltages used in the experiment, i.e., 24V in individual meta-resonance units and the power bank battery, 5V for tablet, phone and blood press monitor usage.

For the various device charging applications described herein, each receiver has a fabricated plastic stand designed with Solidworks and fabricated with a 3D printer. The receiver circuit and receiver coils are installed inside the plastic stand.

B. Power Distribution with One Meta-Resonance Unit

Figure 8A:
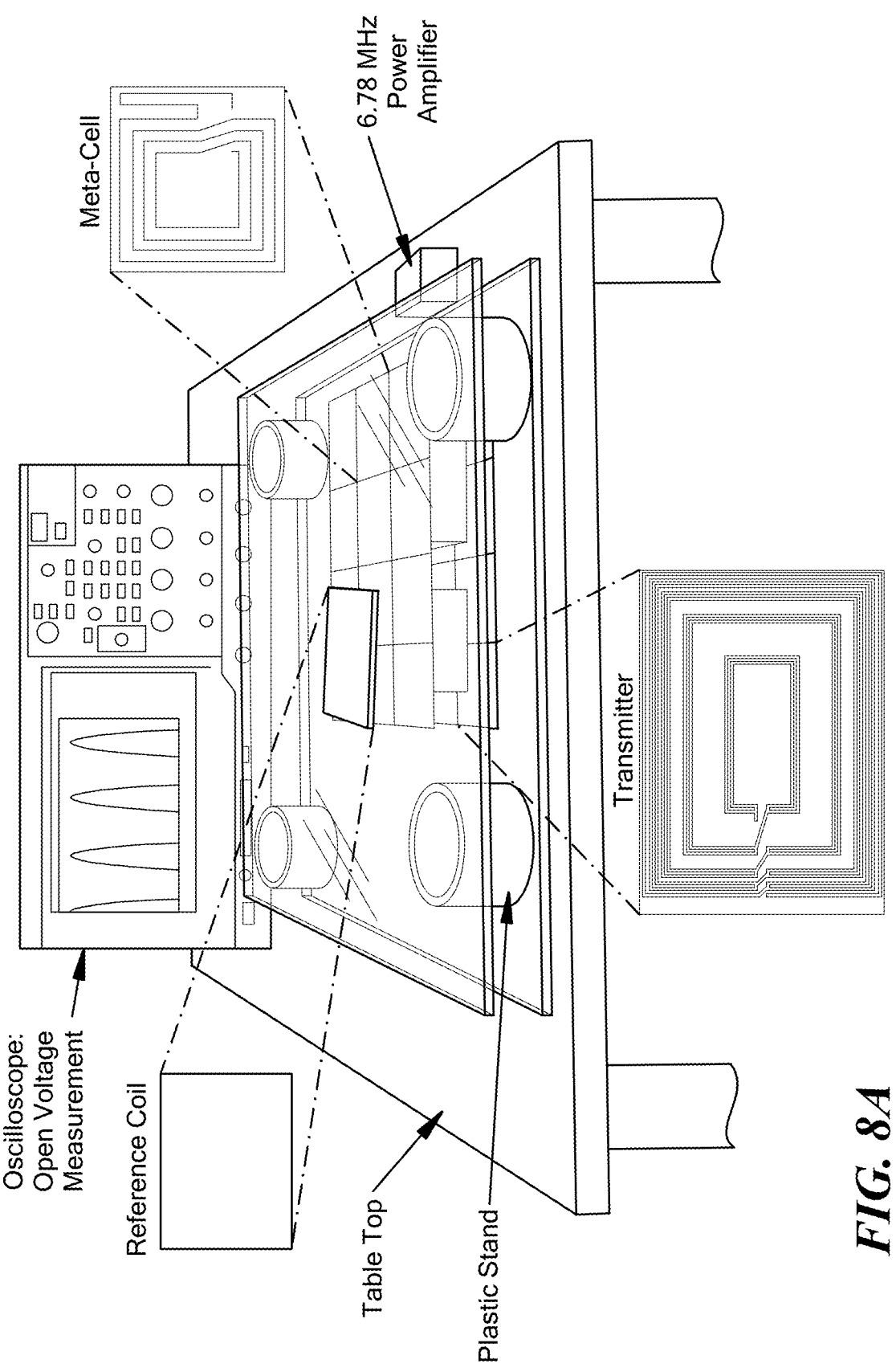
FIG. 8A illustrates an experimental meta-resonance unit set-up for measurement of magnetic field distribution based on the open voltage of the reference coil.
Figure 8B:
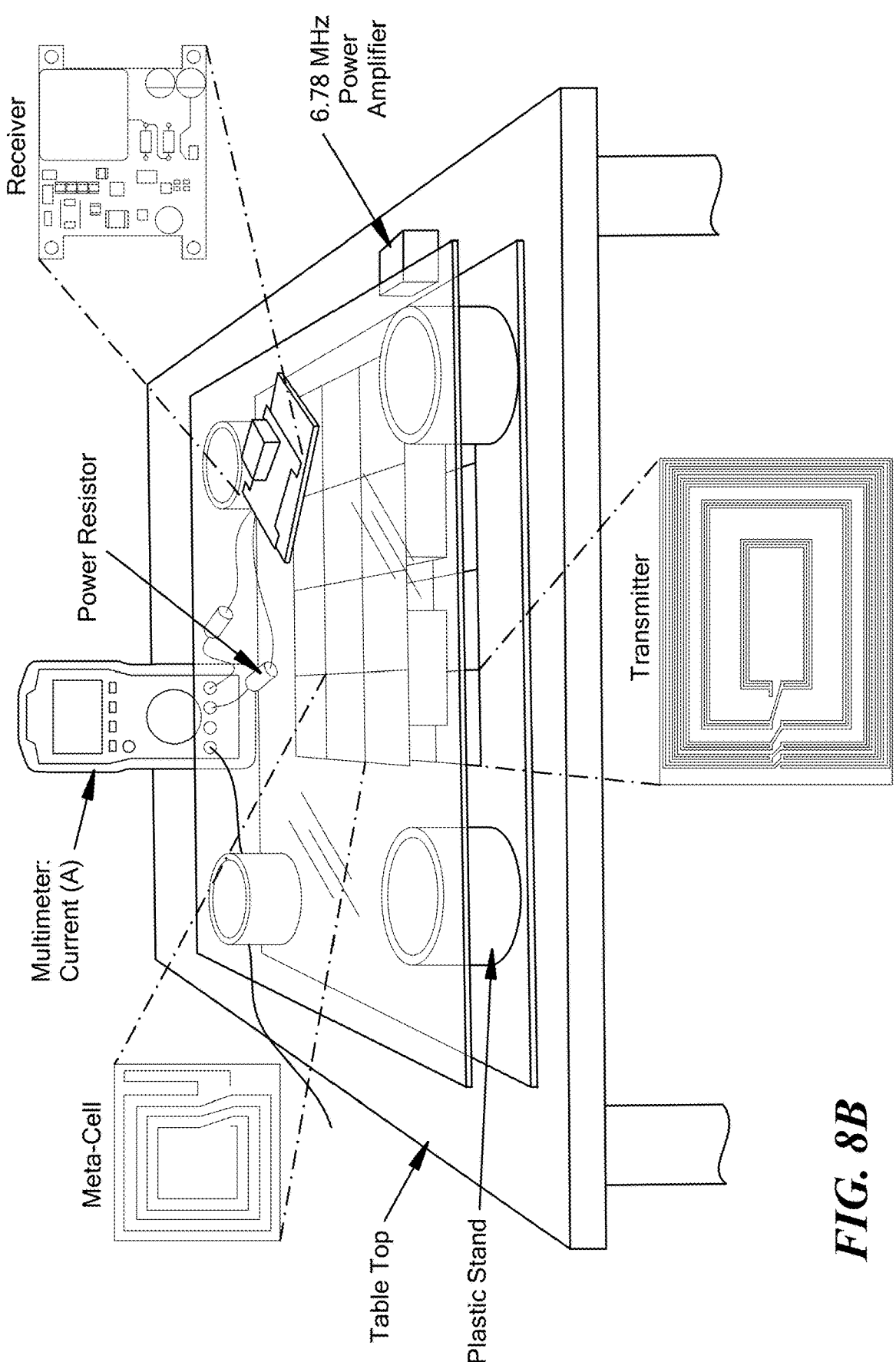
FIG. 8B illustrates an experimental meta-resonance unit set-up for measurement of power distribution based on the received power of the load resistor.

First, the possible customization of the power pattern and improvement achieved in the power efficiency of one meta-resonance unit is described. Different configurations are considered, labeled as config in FIGS. 8C-8Q. The architecture of a meta-resonance unit is shown in FIG. 1B above, and the prototype of this unit is shown in FIGS. 8A and 8B. The setup shown in FIG. 8A aids in measuring the magnetic field distribution using oscilloscope measurements with the open voltage of the receiver coil (reference coil). The second setup shown in FIG. 8B is for measuring the actual received power on a load resistor. In the prototype described herein, the power distribution layer and the meta-resonance layer are separated by h=2 cm, while the gap between meta-resonance layer and the receiver coil is 3 cm. The power source is provided by Class-D power amplifier with maximum 30 W and 6.78 MHz working frequency. Additionally, the meta-resonance layer includes of 12 meta-cell array of the coils in three rows, and all meta-cells are equally separated by 0.5 cm from each other.

The simulation results for the normalized magnetic field distribution over one meta-resonance unit are presented in FIGS. 8C-8G (config1-1) to (config5-1). These are obtained from COMSOL Multiphysics, where normalized magnetic field distribution is defined as the ratio of magnetic field values of each point to the maximum permissible value in the simulation. The experimental results of the magnetic field distribution with oscilloscope measurement are shown in FIGS. 8H-8L (config1-2) to (config5-2), and the power distribution pattern with load measurement are shown in FIGS. 8M-8Q (config1-3) to (config5-3).

Figure 7:
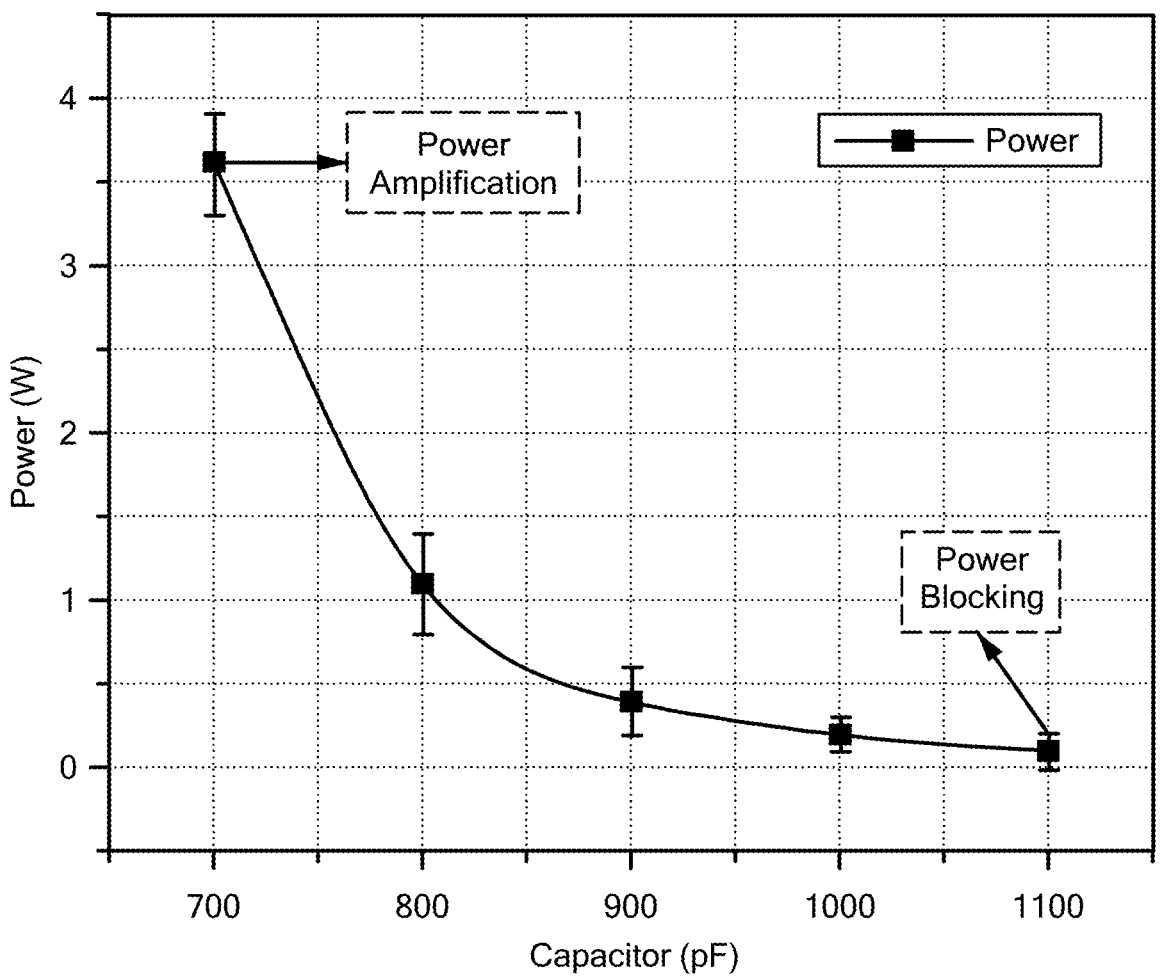
FIG. 7 illustrates a plot of power versus connected capacitance at a corner of the intelligent surface.
Figures 8C, 8D, 8E:
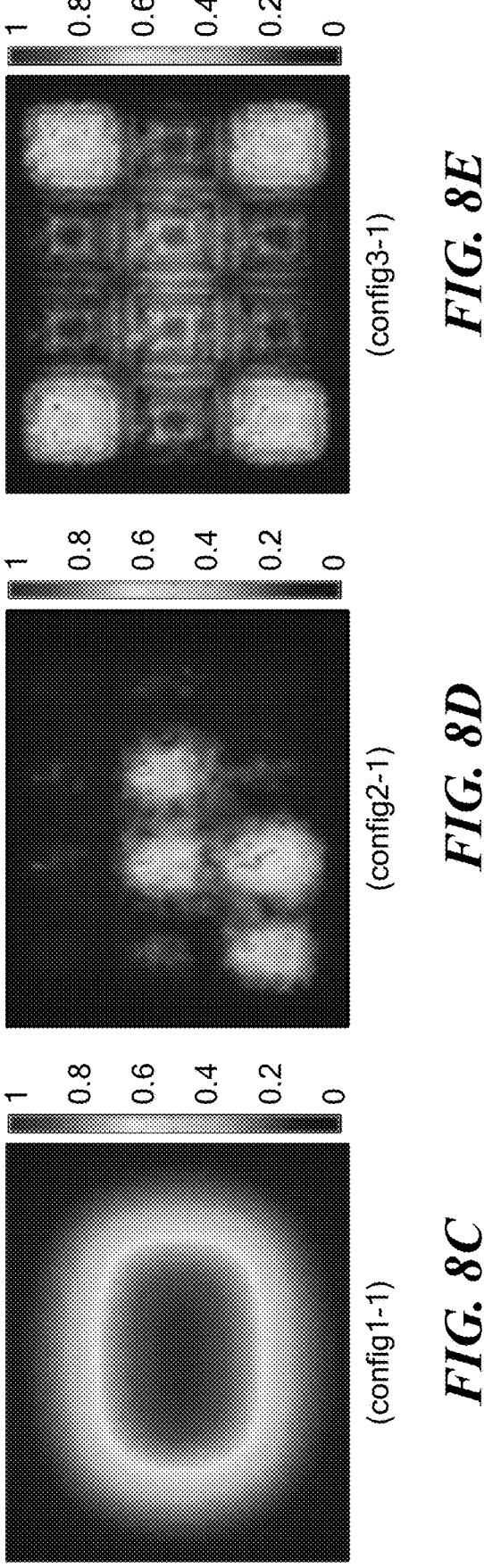
FIGS. 8C-8Q illustrate measured magnetic field and power distribution of one meta-resonance unit in a variety of configurations. In each of the three groupings (FIGS. 8C-8G.
Figures 8F, 8G:
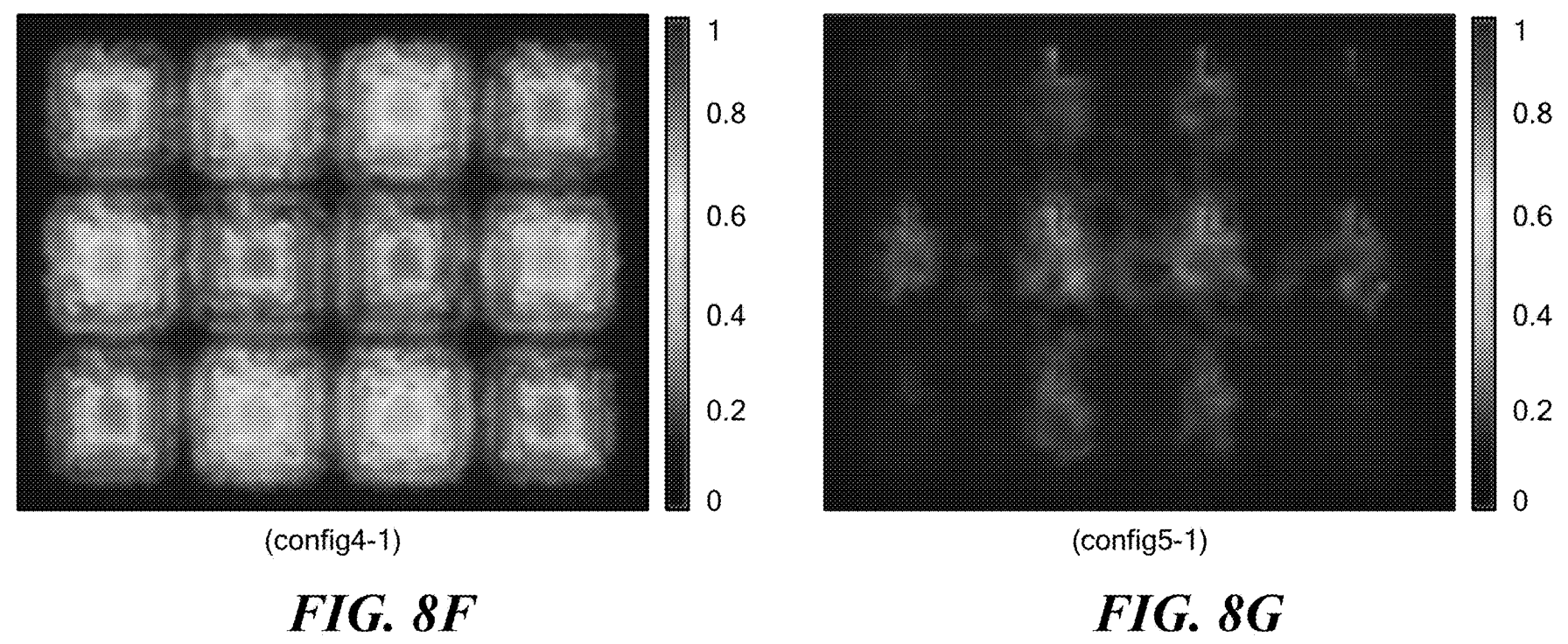
Figure 8H:
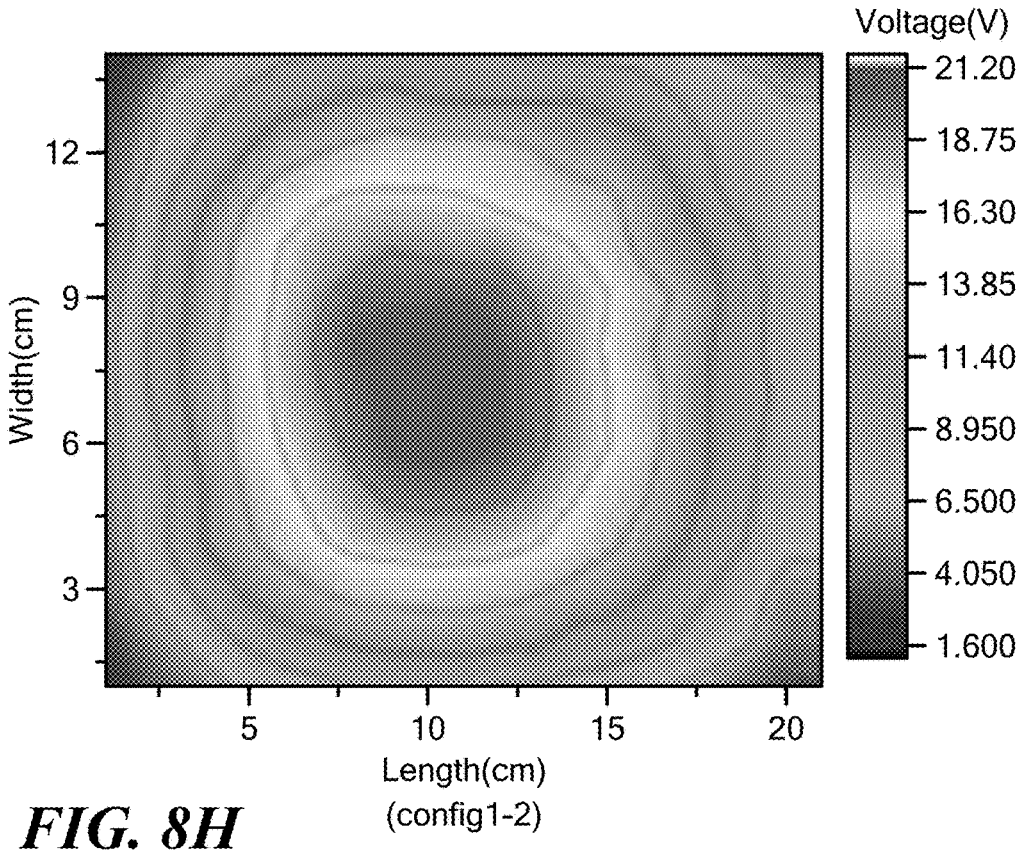
FIGS. 8H-8L.
Figure 8I:
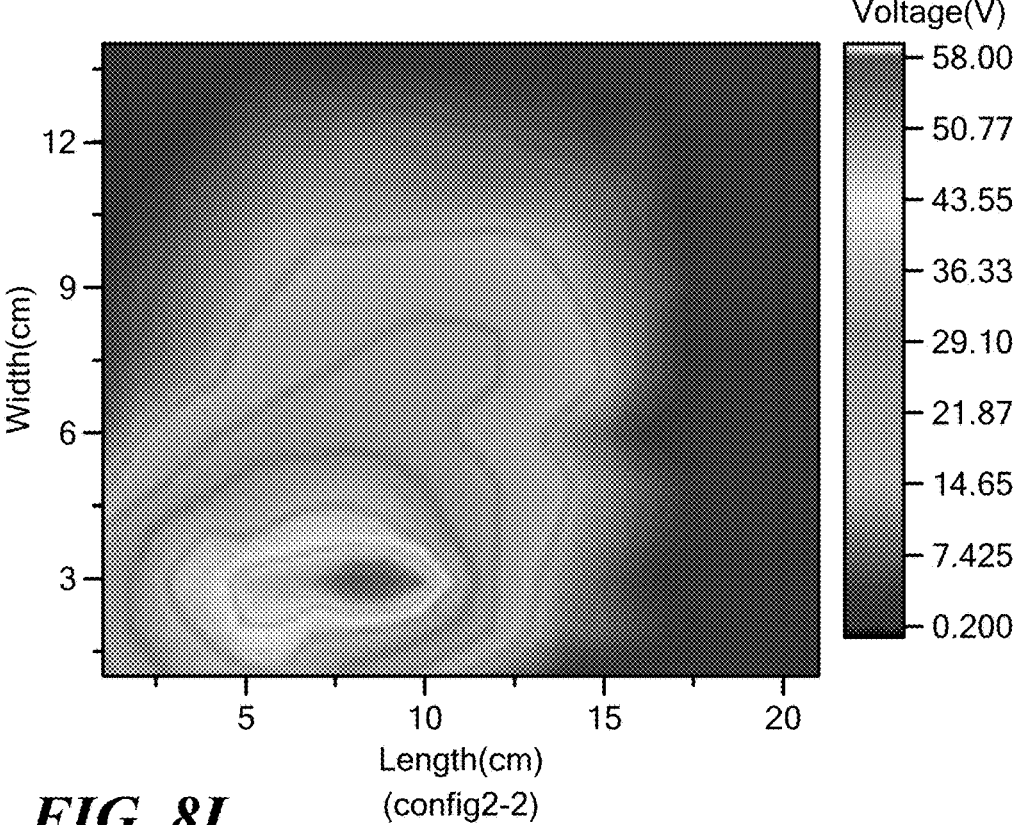
Figure 8J:
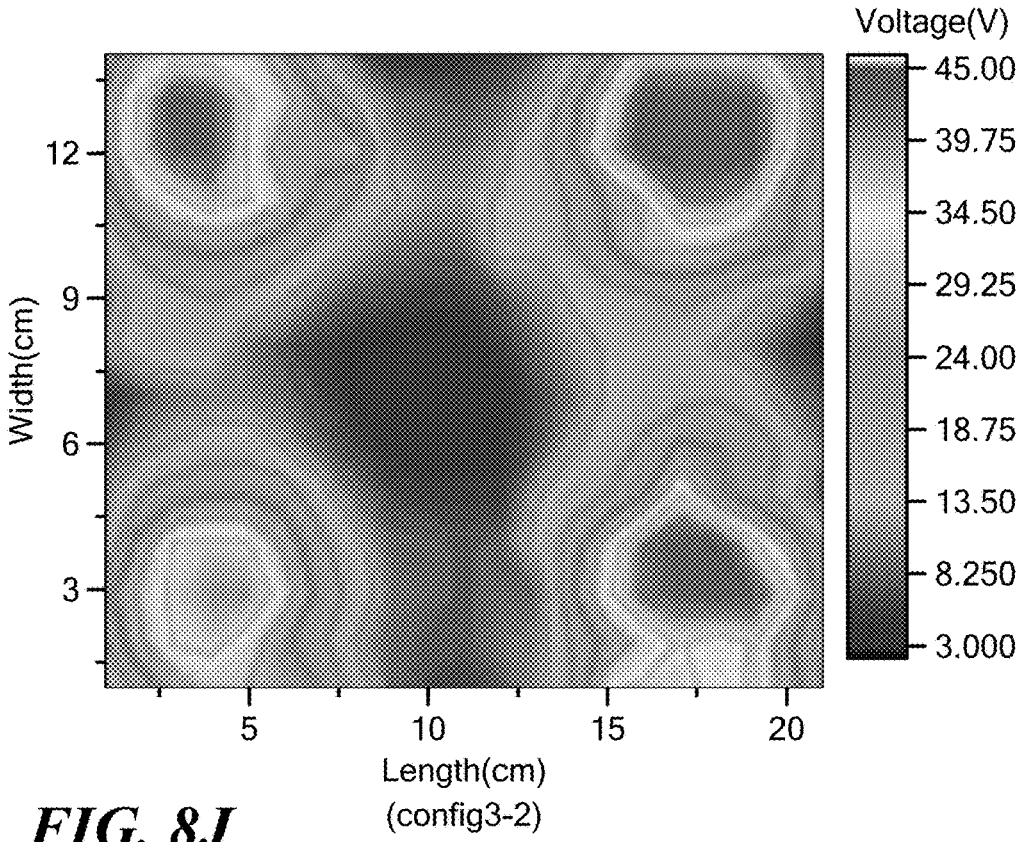
Figure 8K:
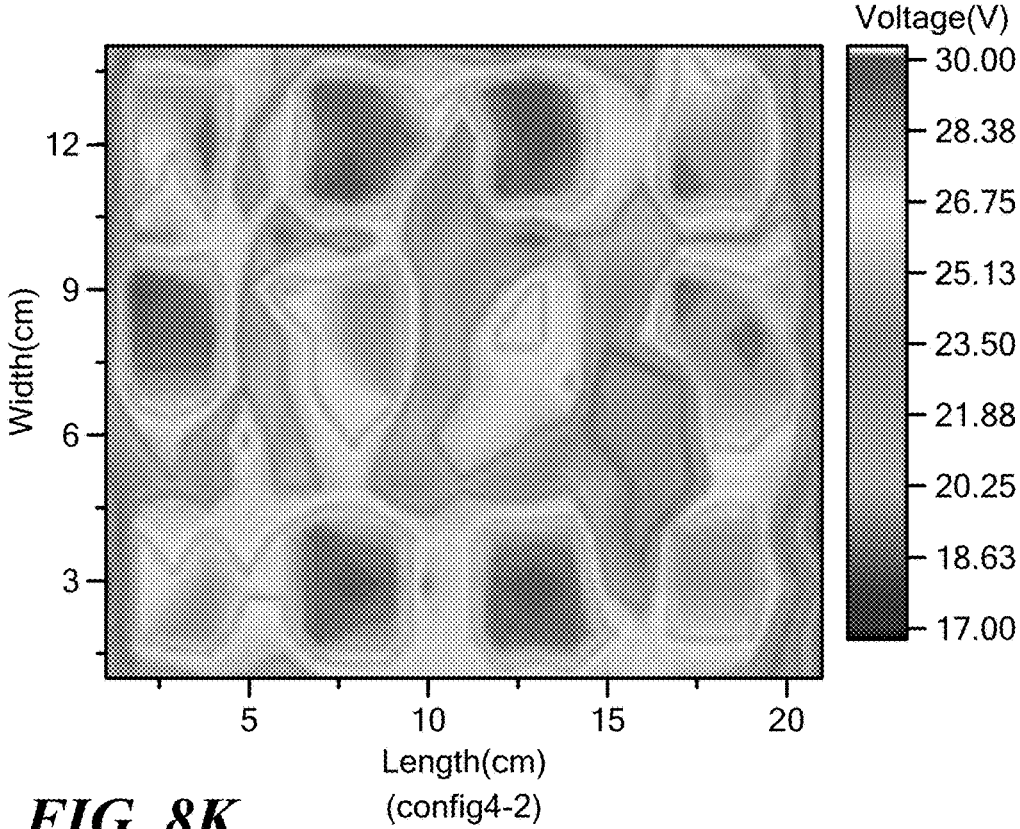
Figure 8L:
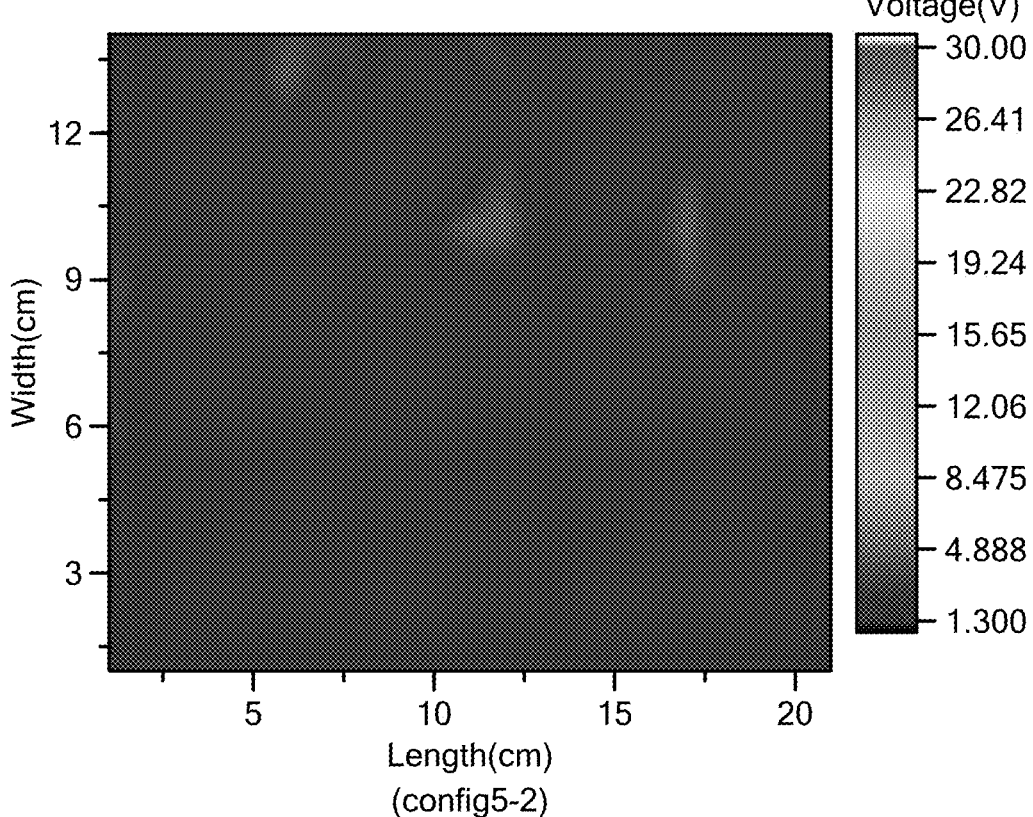
Figure 8M:
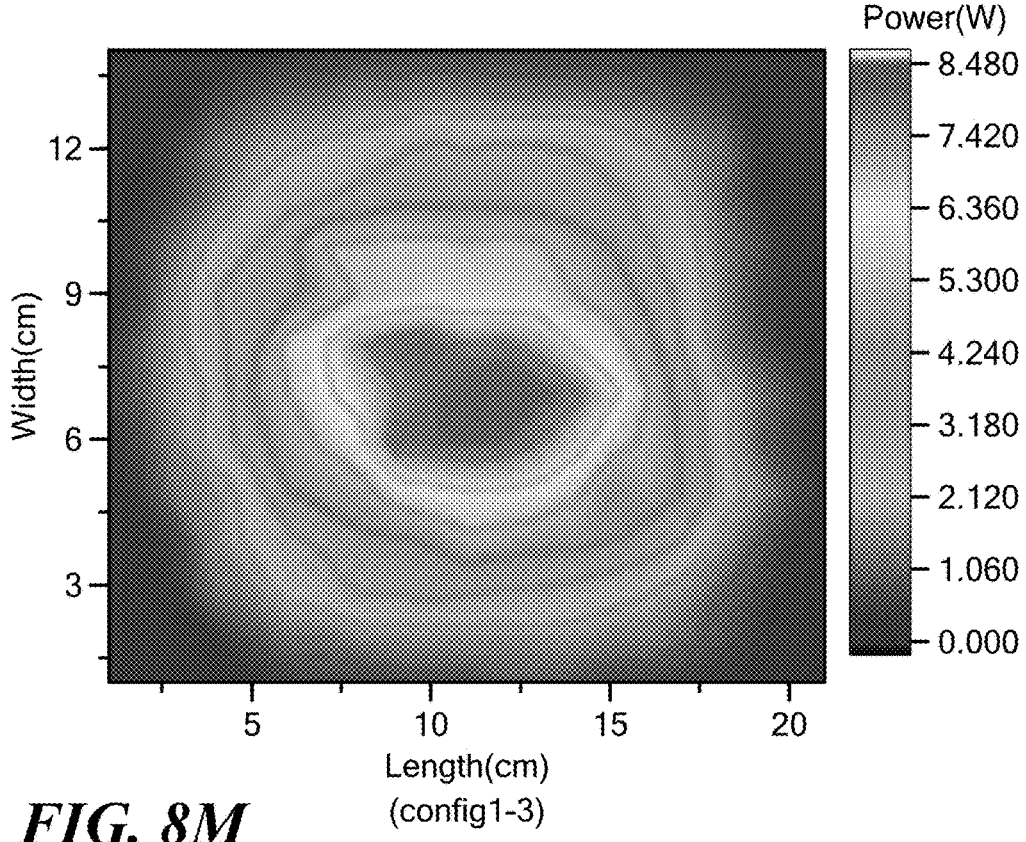
Figure 8N:
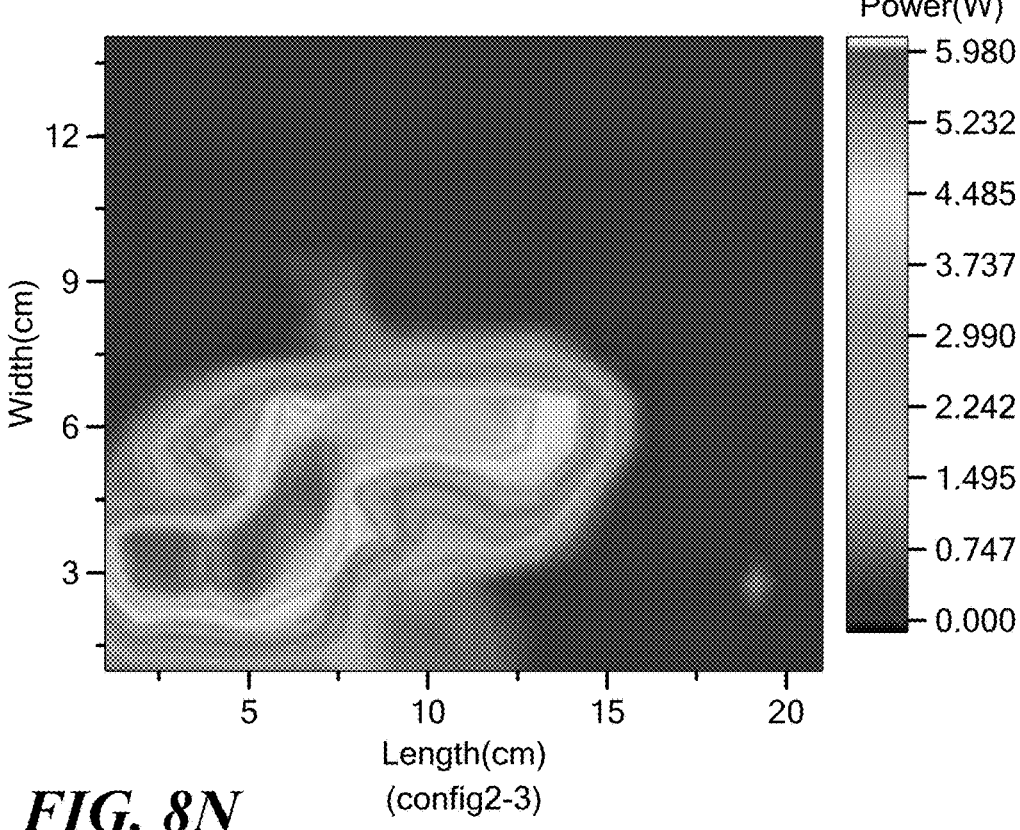
Figure 8O:
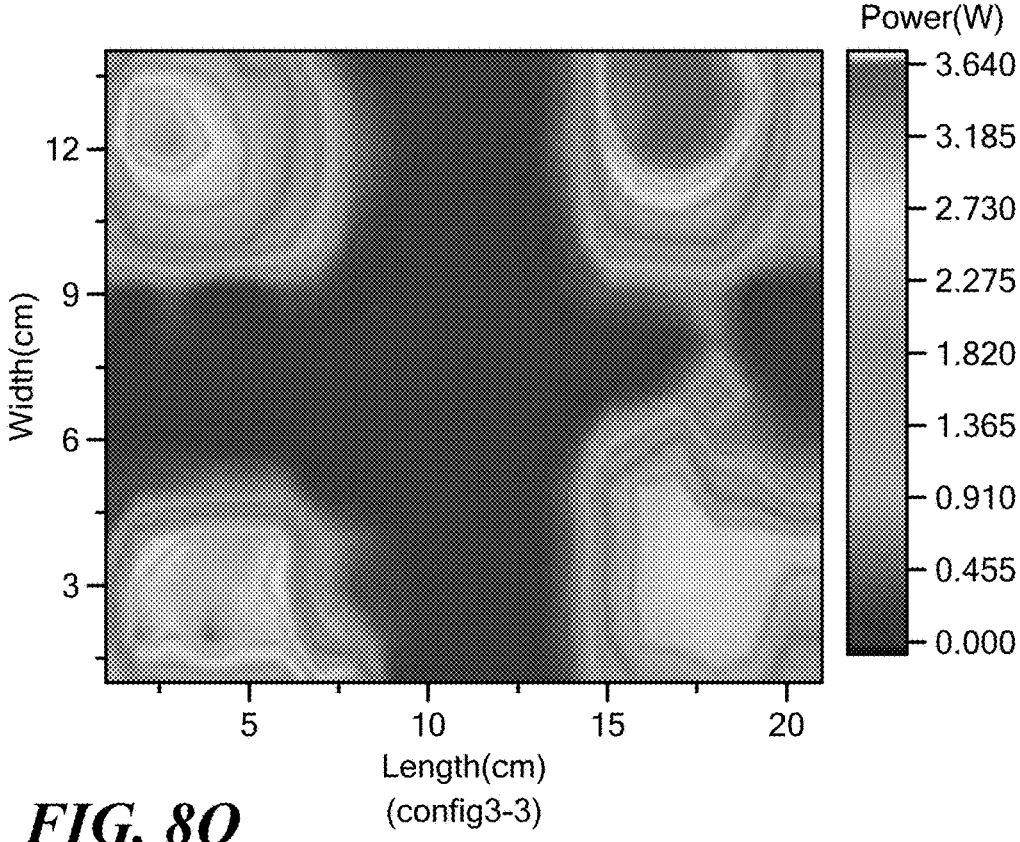

First, the current power distribution limitation in config1, shown in FIGS. 8C, 8H, and 8M (config1-1), (config1-2), and (config1-3). All meta-cell coil units at the meta-resonance layer are placed in open circuit, which has the same effect of connecting a transmitter coil to a power source, which is similar to the methodology followed in the state-of-the-art. The magnetic field and received power results shown in FIGS. 8C, 8H, and 8M (config1-1), (config1-2), (config1-3) reveal that power is maximized at the center of the coil and decreases radially outwards. This concentric pattern not only stays fixed regardless of capacitance changes within the coils in the power distribution layer, but also majorly impacts the received power at the charging electronic devices placed anywhere on the surface. Hence, to create custom varying energy patterns based on the locations of the receivers on a surface, the energy field needs to be dynamically reshaped. The goal at any given time is to maximize the power density at the meta-cells under the locations of the receivers as well as block the power over the other meta-cells for both user-safety and to increase end-to-end power transfer efficiency. FIGS. 8D, 8I, and 8N (config2-1), (config2-2), (config2-3) provide simulation and experimental results for dynamically varying power distributions with the meta-resonance layer. These correspond to optimal energy patterns for delivering power wirelessly, for different numbers and locations of devices over the surface. Notably, these results also reveal that the power at the corner is improved from OW to 5 W by applying the meta-cells, which show the outstanding performance of increasing the power transfer density and, accordingly, charging distance. Based on the above theory and using equation 13, capacitor values of the meta-resonance layer can be selected such that the meta-cell coil at the left bottom corner amplifies the power, the meta-cell coils in the center allows the power to normally pass with open coil connections, with remaining meta-cells blocking the power. The capacitance value of the meta-cell could be found through two scenarios: 1) the received power from the corner of the transmitter can be maximized, and 2) the power passing through the center of the transmitter can be blocked. With the capacitor value range from the FIG. 3 as a reference, the power change from the receiver as shown in FIG. 8B and the corresponding capacitor are plotted in FIG. 7.

The results show that a meta-cell connected by a capacitor with around 700 pF maximizes the received power at the corner, which only has a 30 pF difference compared with the theoretical value. This error is acceptable in the experiments and, in any event, the received power is close to 0 with a connected capacitance of 1100 pF. The plotted trend demonstrates that capacitance bigger than 1100 pF has better performance of power blocking.

Given the multiple experimental results, in the following implementation, the average capacitor values of the meta-cell for power amplification and power blocking are determined as 707 pF and 1120 pF, respectively. In the same way, FIGS. 8E, 8J, and 8O (config3-1), (config3-2), (config3-3) shows maximization of the power under the four corner locations with power blocking for the rest. Additional, the received power at FIG. 8O (config3-3) is lower than received power shown in FIGS. 8M and 8N (config1-3) and (config2-3). This is because the received power is divided into four parts and four charging devices can get power at these positions simultaneously.

Figure 8P:
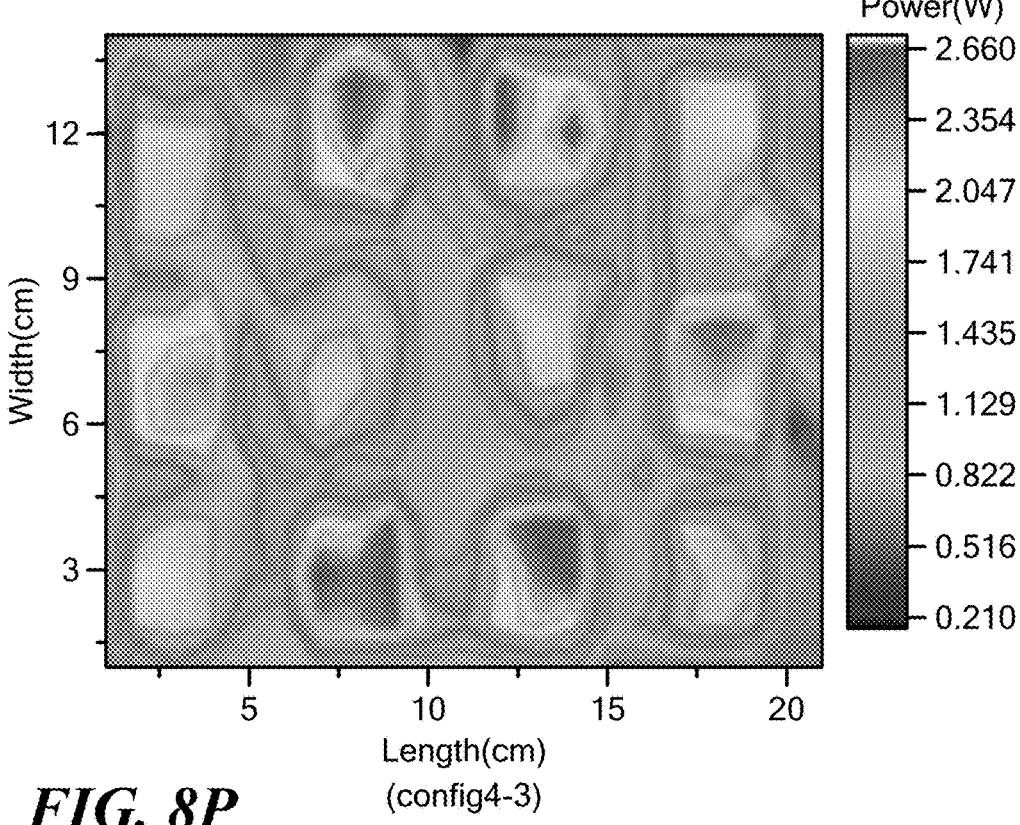
Figure 8Q:
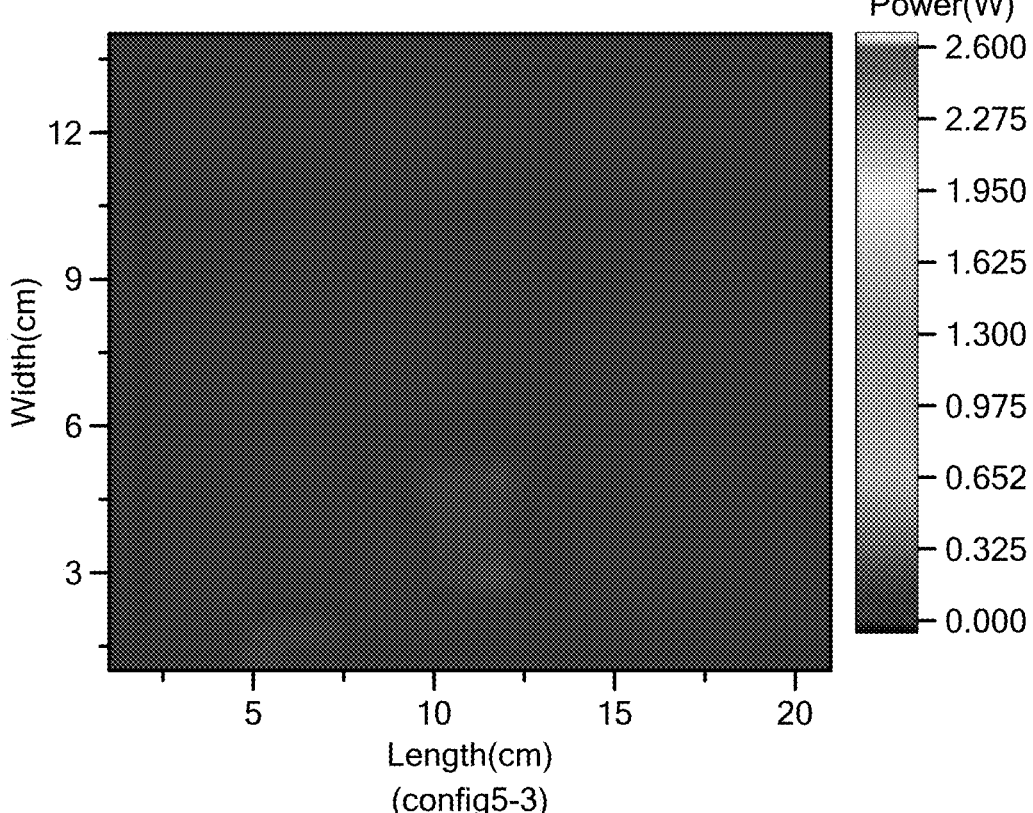
Figure 8T:
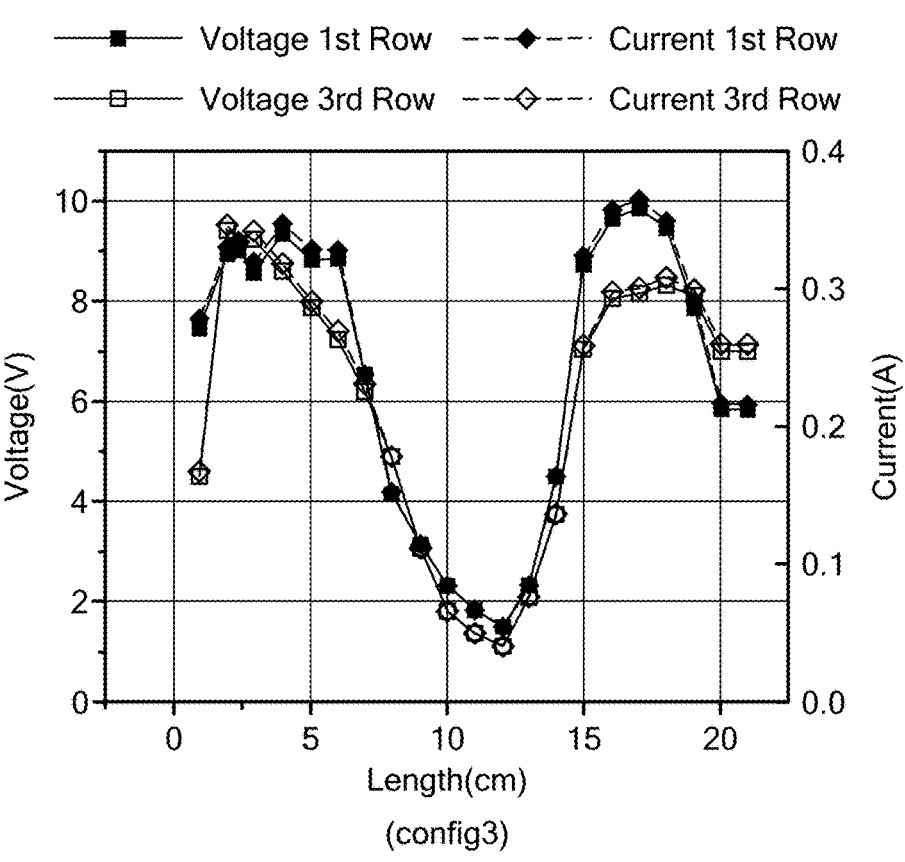
Figure 8U:
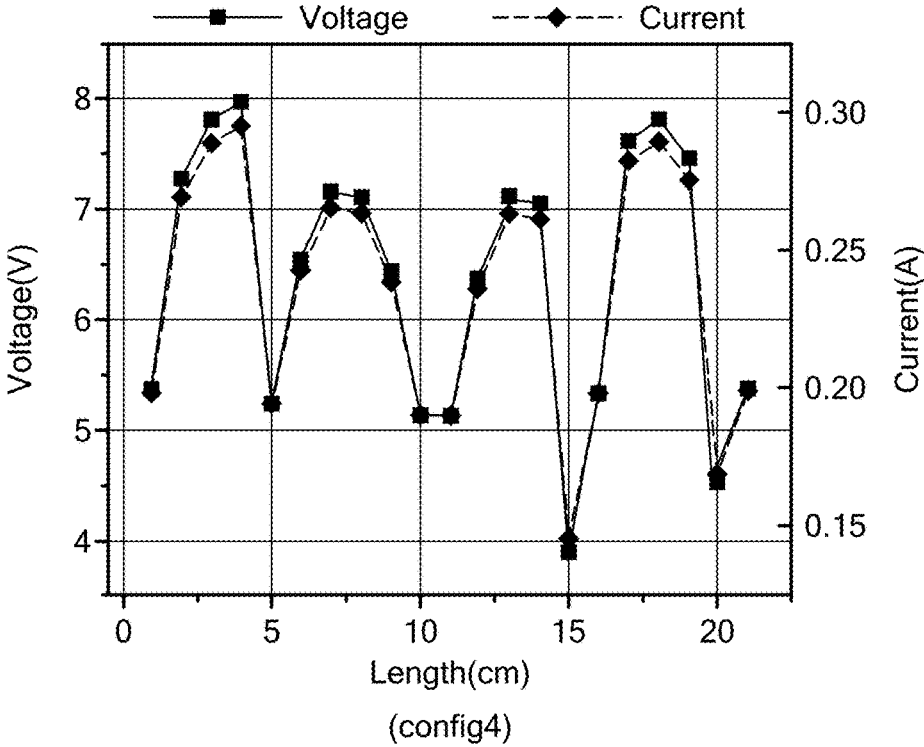
Figure 8V:
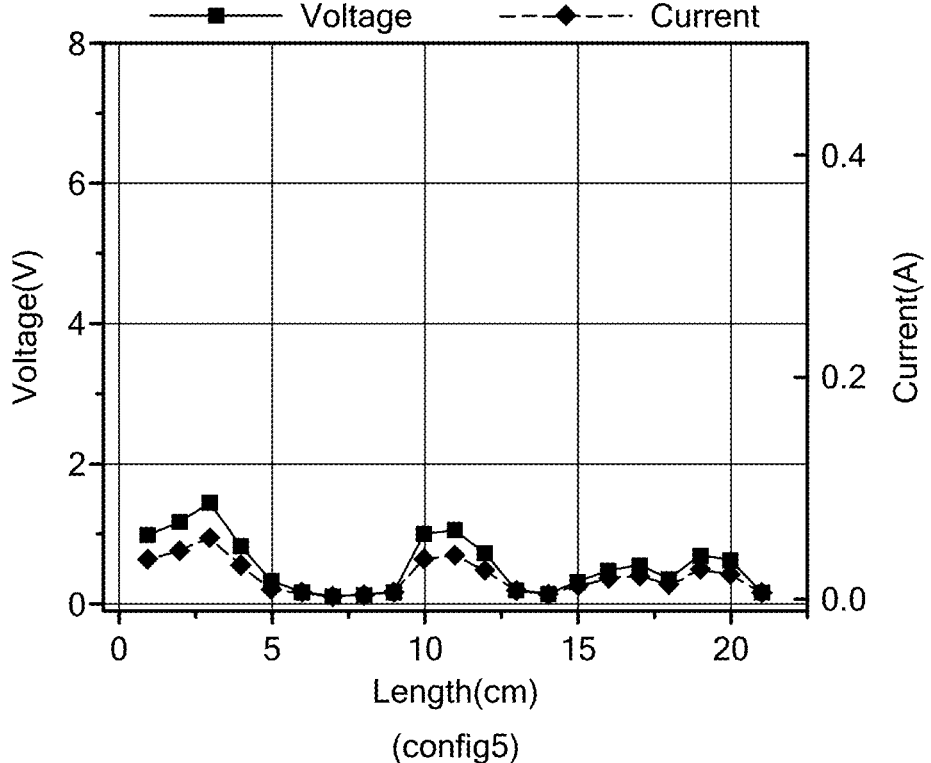

For the whole surface, 12 spots are created in FIGS. 8F, 8K, and 8P (config4-1), (config4-2), (config4-3), with the maximal possible power delivered in each spot. As before, since the input power is divided into 12 parts, the power at each spot is lower than the power shown in FIGS. 8E, 8J, and 8O (config1-3), (config2-3) and (config3-3). Here, 12 devices can be charged at same time. This method maximizes the utilization of the power, increases the power efficiency and reduces the power loss in regions of the surface without devices. In the last configuration shown in FIGS. 8G, 8L, and 8Q (config5-1), (config5-2), (config5-3), it is observed that the meta-surface blocks the power over the whole surface. Here, the power delivery decreases by more than 95%, which isolates interference caused by the magnetic field and thus ensures the human safety not impacted by strong magnetic fields. Furthermore, the voltage and current of receiver load as a function of the length over the surface are obtained under each configuration and are shown in FIGS. 8R-8V. Specifically, in each of configs 1 and 5, voltage and current values are recorded from one edge to the cross edge through the center of the meta-cell array at the second row. In configs. 2, 3, and 4, the corresponding voltage and current are measured from one edge to the cross edge through the center of the meta-cell array at first and second row, first and second row, and the second row, respectively. Based on the results of simulation and experiments, it is observed that the power distribution is not a uniform pattern. This is because the meta-cell won't change the location-dependence property of the power distribution pattern from meta-cell to receiver, as proved by equation 14.

With the redistributed power pattern, the power transfer efficiency was experimentally studied, such as the end-to-end power efficiency and DC-DC efficiency, with meta-cell and the loss analysis for power amplification, power blocking and power normally passing. The end-to-end power efficiency is defined in one meta-resonance unit as the ratio between the received power at the reference coil and the output power of the amplifier. Accordingly, the end-to-end power efficiency for the first configuration (config 1) is obtained as 34%. Similarly, for config 2,3, and 4 this is 92.8%, 72%, and 48%, respectively. DC-DC efficiency for one meta-resonance unit is defined as the ratio between the received power on the load of the receiver (shown in FIG. 8B) and the input power of the power amplifier. Similar to the end-to-end power efficiency, four configurations are considered, the obtained DC-DC efficiency are 31%, 81.2%, 62% and 41% for config 1, 2,3, and 4, respectively. The DC-DC efficiency is lower than the end-to-end power efficiency due to the loss from the DC-DC converter in the receiver power management circuit. With end-to-end and DC-DC energy efficiency, the power efficiency decreases as the number of receivers increases. In particular, for the case with more number of devices, the source power distributed over more locations. As opposed to this, for the case with lower number of devices, power is concentrated over fewer locations. Additionally, compared to the case with no meta-resonance (config 1), significant improvement is observed in end-to-end power efficiency. As an example, for the case of no-meta resonance, power is distributed regardless of the receiver location in a concentric manner based on the physical characteristics of the coil.

In the experiment, the intrinsic resistance of the meta-cell leads to the loss ($P_{loss}$). In the scenario of power normally passing, the power loss is 0 since the meta-cell is an open circuit and no current is circulating inside the meta-cell. The loss can be calculated via the current circulating (I) inside the meta-cell and the intrinsic resistance $P_{loss}=I^2R_{intr}=(|V/Z|)^2R_{intr}$. Here, V is the measured voltage inside the meta-cell, $$Z = R_{intr} + j\omega L - \frac{1}{j\omega C}$$

is the impedance of the meta-cell, L is the inductance, C is the capacitance of the connected capacitor, and $\omega$ is the working frequency. The fabricated meta-cell has intrinsic resistance $R_{intr}$=0.1 ohm, inductance L=0.388 µH, and C=1120 pF. The maximum power loss of individual meta-cell for power amplification and power blocking could be calculated as $$P_{loss}^a = 0.058W \text{ and } P_{loss}^b = 0.01W,$$

respectively. The total loss distribution with N meta-cell would be calculated as $NP_{loss}$. The quality of the fabrication highly impacts these losses. Therefore these losses can be optimized by adjusting the thickness or the number of the turns of meta-cell. In the practical use case, these losses are acceptable for power amplification and blocking.

C. Power Distribution with Multiple Meta-Resonance Units

Figure 9A:
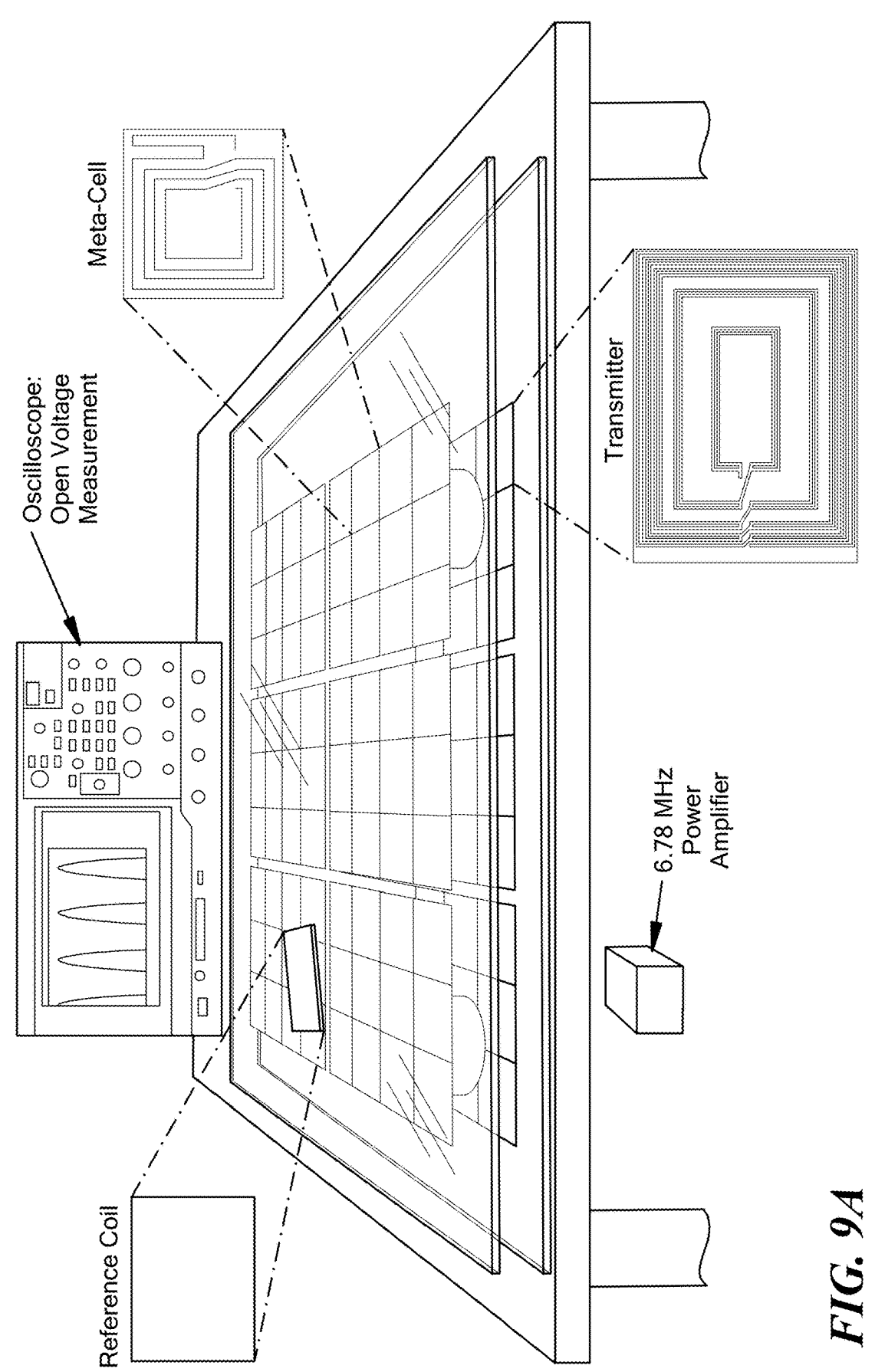
FIG. 9A illustrates an experimental setup including multiple meta-resonance units for magnetic field distribution measurement based on the open voltage of the reference coil with an oscilloscope
Figure 9B:
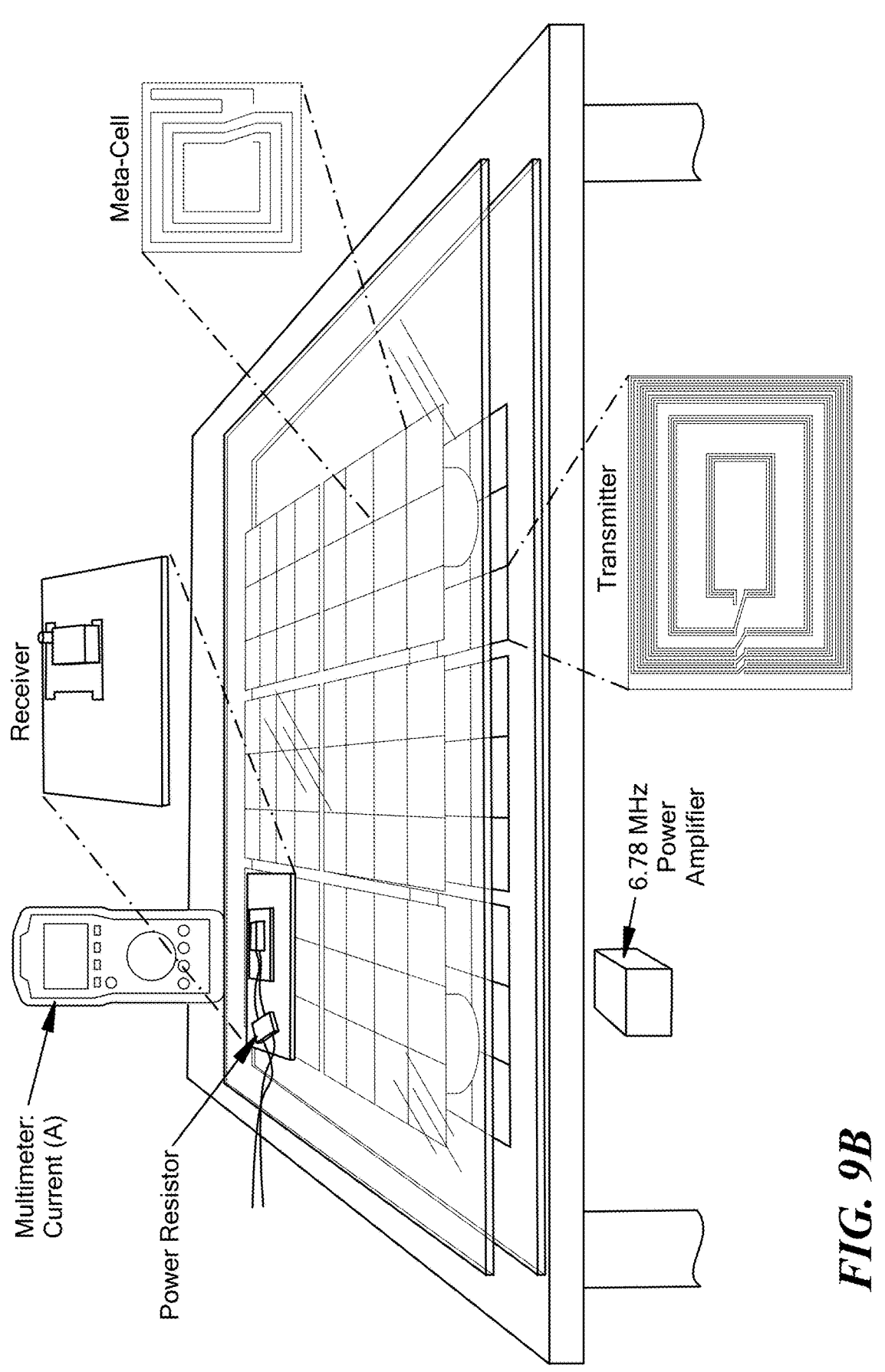
FIG. 9B illustrates an experimental setup including multiple meta-resonance units for power distribution measurement based on the received power of the load resistor with a voltage meter.

Based on the performance of an individual meta-resonance unit, this section extends the study for a large surface with multiple meta-resonance units. The power propagates along the (bottom) power distribution layer via energy hopping among transmitter coils, while the meta-resonance layer controls the power redistribution over the (top) meta-resonance layer. The architecture of the multiple meta-resonance units on a large surface is depicted in FIG. 1A, where only the first transmitter resonator is connected to the power source. The power from source resonator propagates to different resonators within the same layer. The experimental set-up for a large surface is shown in FIGS. 9A and 9B, which are composed of six meta-resonance units in two rows and three columns. The tuple labels are as given in FIG. 1A, where the resonator that is connected to the power amplifier is identified as (1,1). The power amplifier is same as the one in the previous section with maximum 30 W input power and 6.78 MHz working frequency. The distance between the power distribution and the meta-resonance layers is h=5 cm, the edge-to-edge gap between transmitter coils is 1.5 cm, and the separation between meta-cell coils in the meta-resonance layer is 0.5 cm. Over 72 meta-cell coils were fabricated and used in this test. Here, the flow within the power distribution layer has two active paths: (1,1)-(1,2)-(1,3)-(2,3) and (1,1)-(2,1). The approach of how to create these two paths is based on the impedance analysis of energy hopping inventors' prior work, which is not explained here. The connected capacitors for each transmitter are given as [110 pF, 135 pF, 115 pF, 120 pF, 0, 130 pF] for transmitters with tuples [(1,1), (1,2), (1,3), (2,1), (2,2), (2,3)], respectively.

To study the power transfer performance using the meta-resonant intelligent surface wireless power transfer system, first, extensive simulations were performed, followed by experimental validations. The first experimental set-up is shown FIG. 9A, where the meta-cell coils on the top layer are set to open voltages. This situation is identical to traditional energy hopping. The open voltage at the reference coils (same coils as on meta-resonance unit) is measured via an oscilloscope.

Figure 10A:
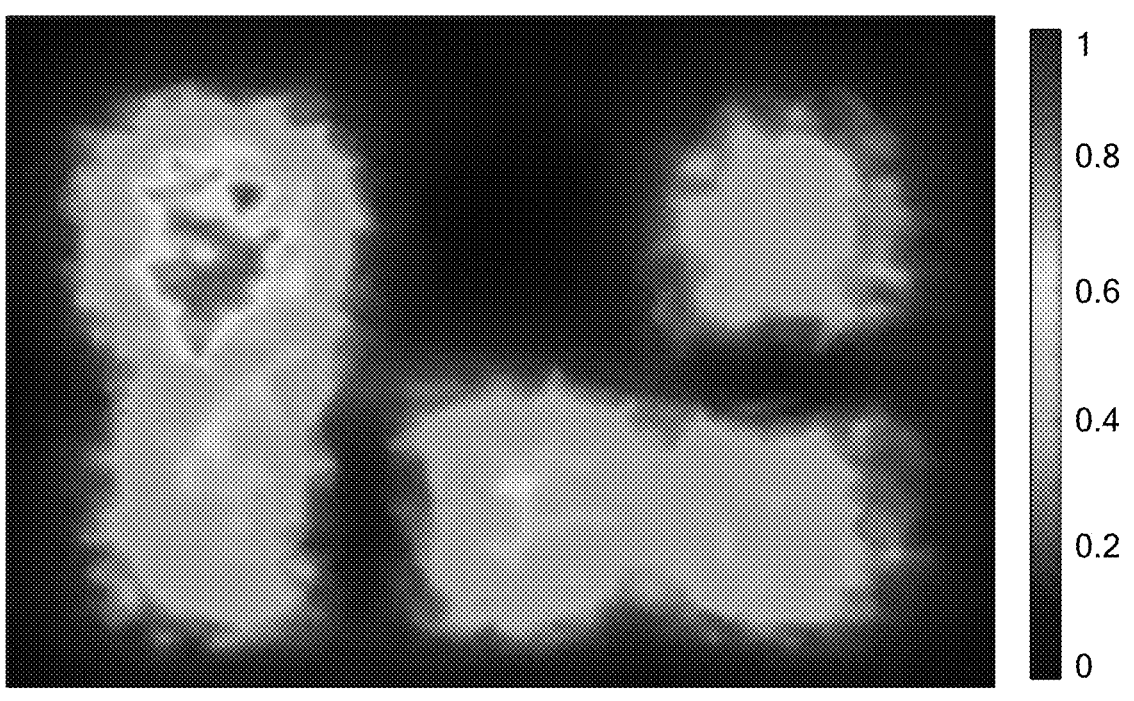
FIG. 10A illustrates simulated magnetic field and power distribution patterns of an intelligent surface for a configuration including a combination of energy hopping and an open-voltage meta-resonance layer. Results show how the meta-resonance layer allows the wireless power transfer over a large surface.
Figure 10B:
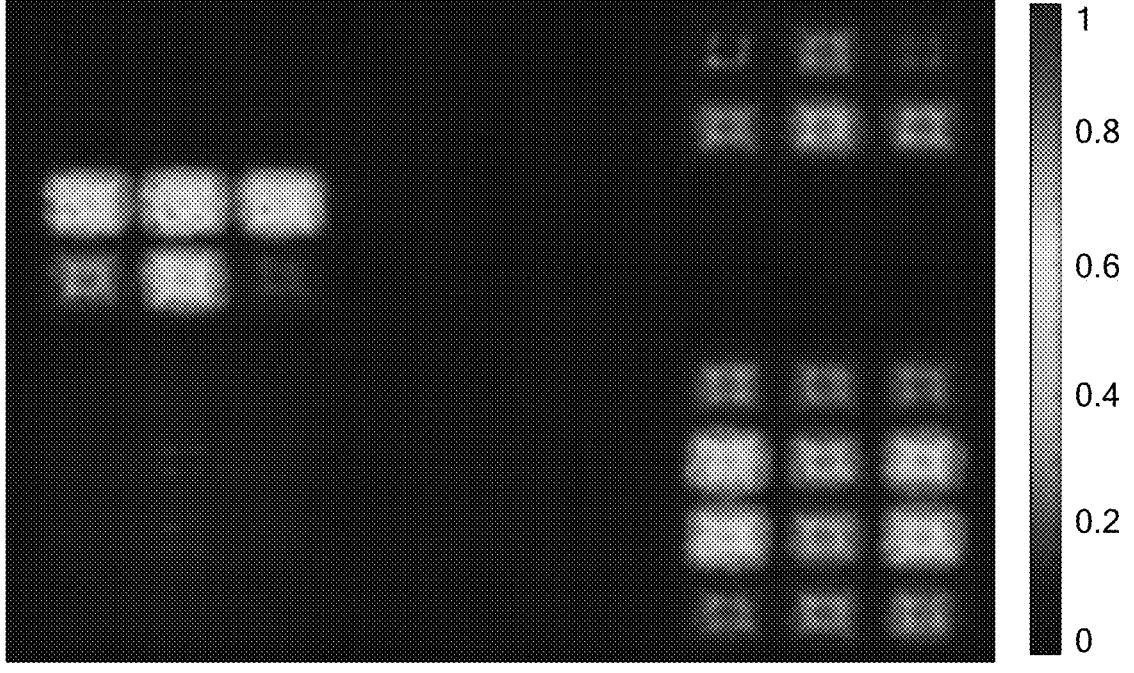
FIG. 10B illustrates simulated magnetic field and power distribution patterns of an intelligent surface for a configuration including a combination of energy hopping and an active meta-resonance layer. Results show how the meta-resonance layer allows the wireless power transfer over a large surface.
Figure 10C:
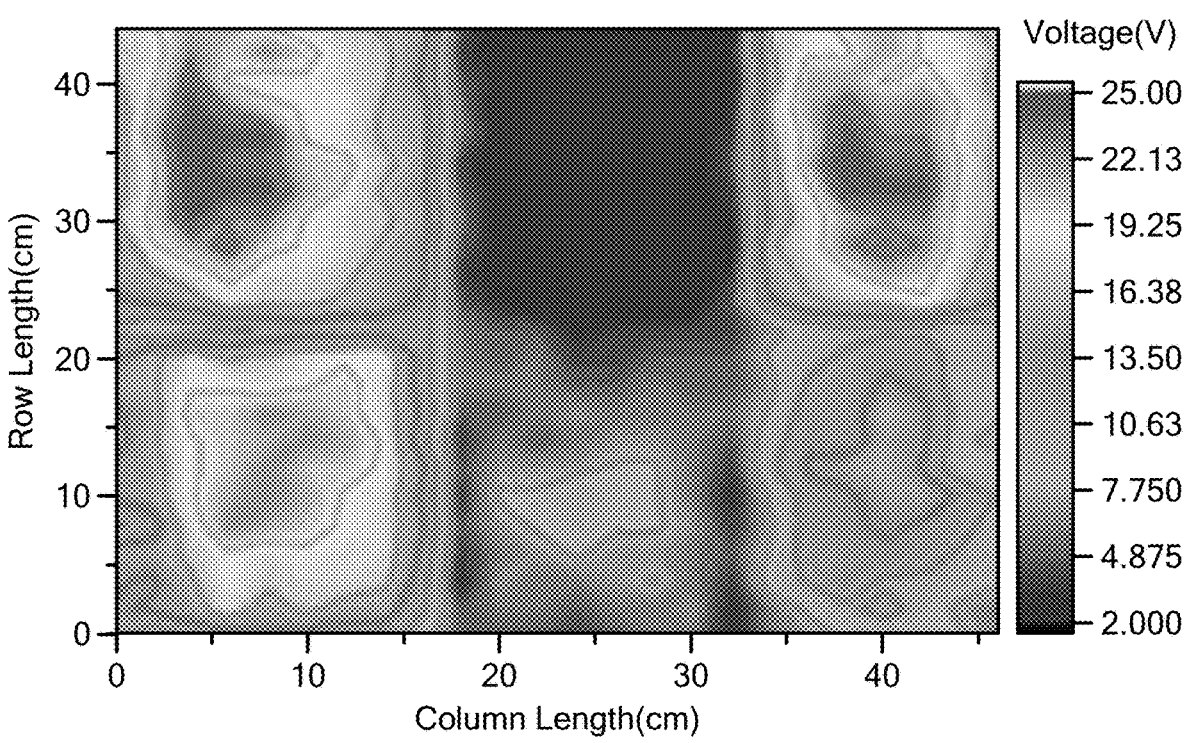
FIGS. 10C and 10E illustrate experimental results for magnetic field and power distribution patterns of the intelligent surface in the configuration of FIG. 10A.
Figure 10D:
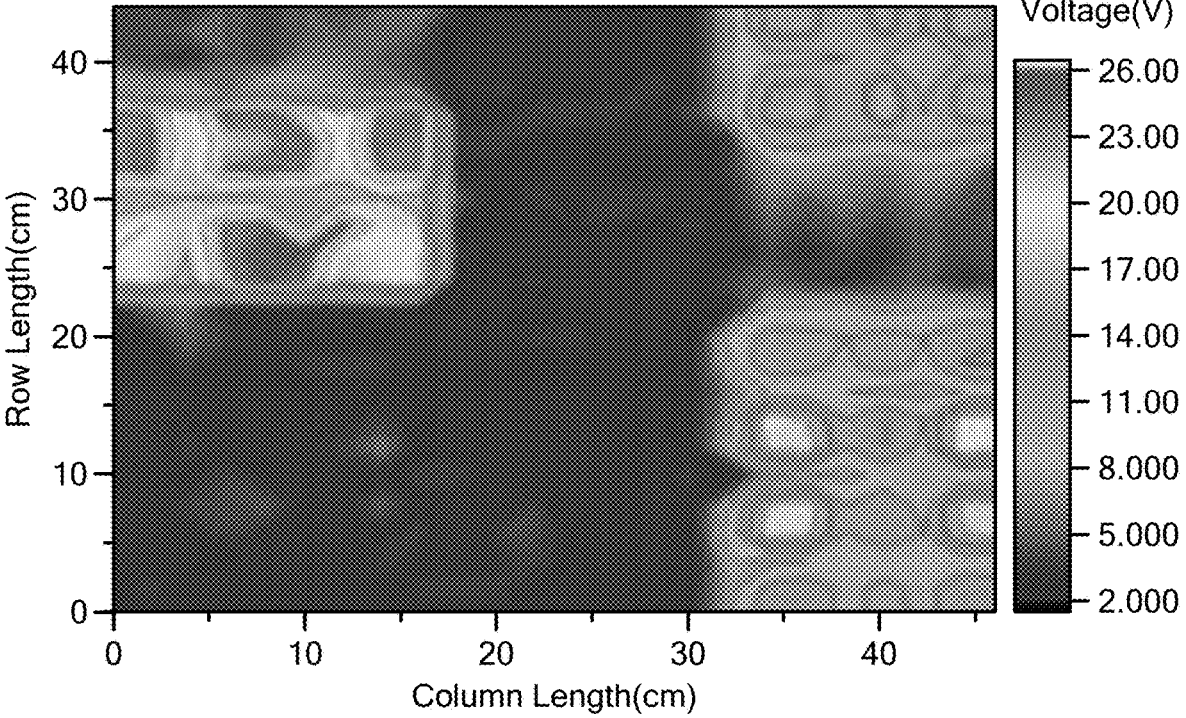
FIGS. 10D and 10F illustrate experimental results for magnetic field and power distribution patterns of the intelligent surface in the configuration of FIG. 10B.
Figure 10E:
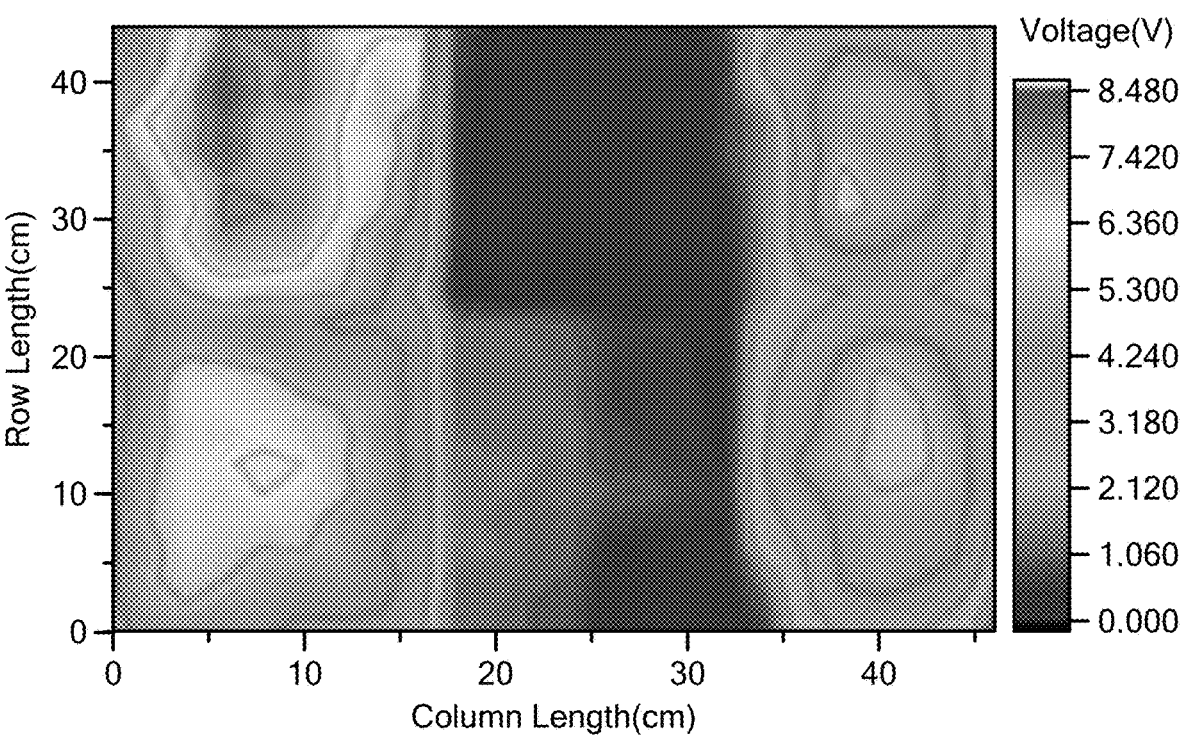

The second experimental setup maps the power distribution over the meta-resonance layer based on the load resistor. Here, the receiver coil in this experiment has size 10 cm×15.5 cm and inductance 1.2 µH. A larger receiver coil was used to ensure higher received power, longer transfer distance, and larger overlap area between the receiver and transmitter coils. Using this configuration without the meta-resonance layer, FIG. 10A shows the normalized COMSOL simulation results for open voltage meta-resonance layer. Only the transmitters (1,1), (1,2), (1,3), (2,1) and (2,3) provide power. Furthermore, FIGS. 10C and 10E show the experimental results for the reference coil voltage and the received power at the load resistor for the same configuration as FIG. 10A.

Figure 10F:
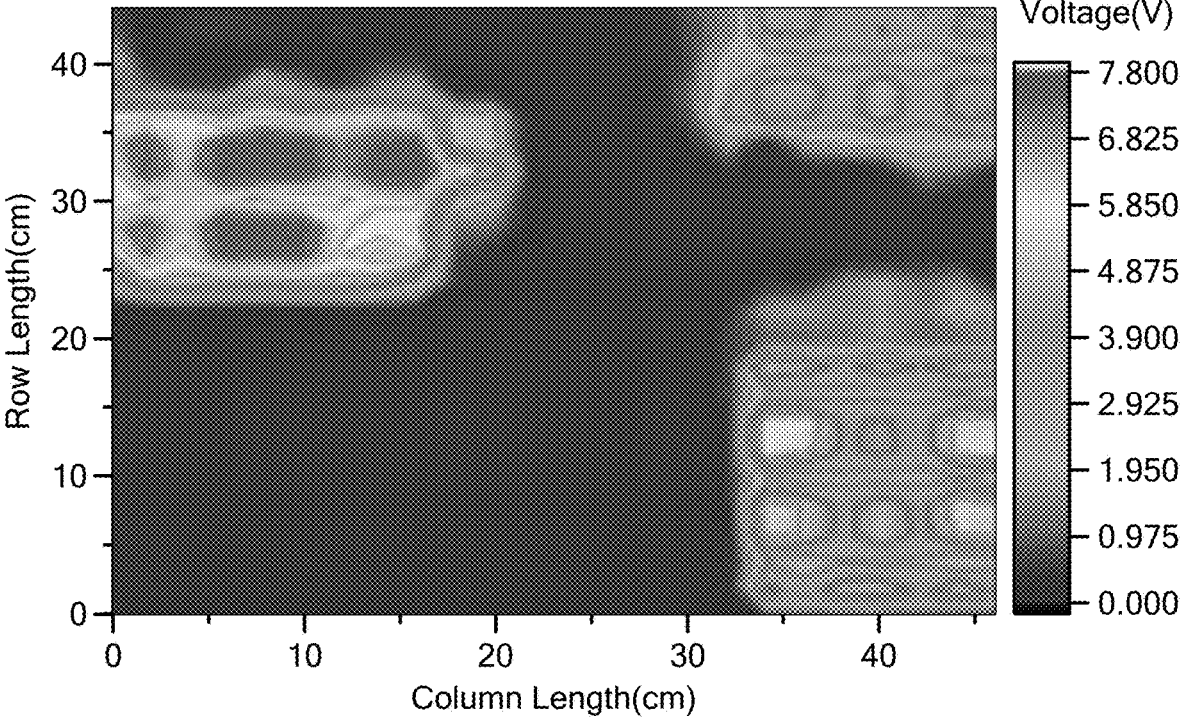

The energy field is either present over the entire area of a transmitter coil or it is totally absent. No customization of energy patterns, amplification of power, and blocking capability is possible over the surface. On the other hand, FIG. 10B shows the COMSOL simulation results for normalized magnetic field over surface with an active meta-resonance layer. FIGS. 10D and 10F show the experimental results for the reference coil voltage and the received power at the load resistor for the same configuration as b. Furthermore, the energy patterns can be customized with high granularity and create variable sized areas of blocked power. For example, the measured voltage on the transmitter coil (1,1) decreases from 22V for the non-meta-resonance case (FIG. 10C) to almost zero with the meta-resonance blocking (FIG. 10D). Also, the received power from transmitter coil (1,1) decreases from 7 W to 0 W, as shown in FIGS. 10E and 10F by utilizing meta-resonance blocking.

Figure 11A:
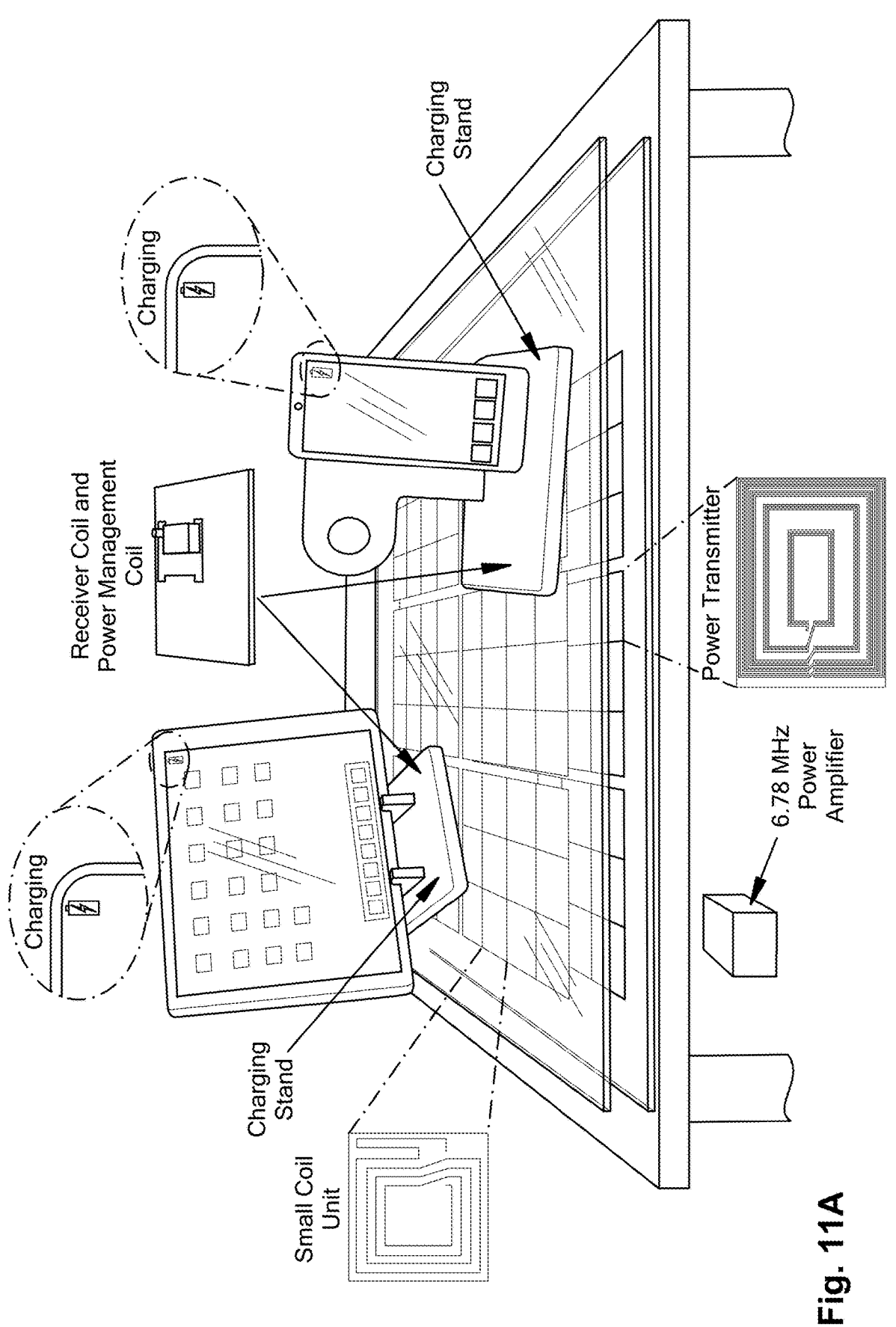
FIG. 11A illustrates an experimental set-up for meta-resonance wireless power transfer over the intelligent surface.
Figure 11B:
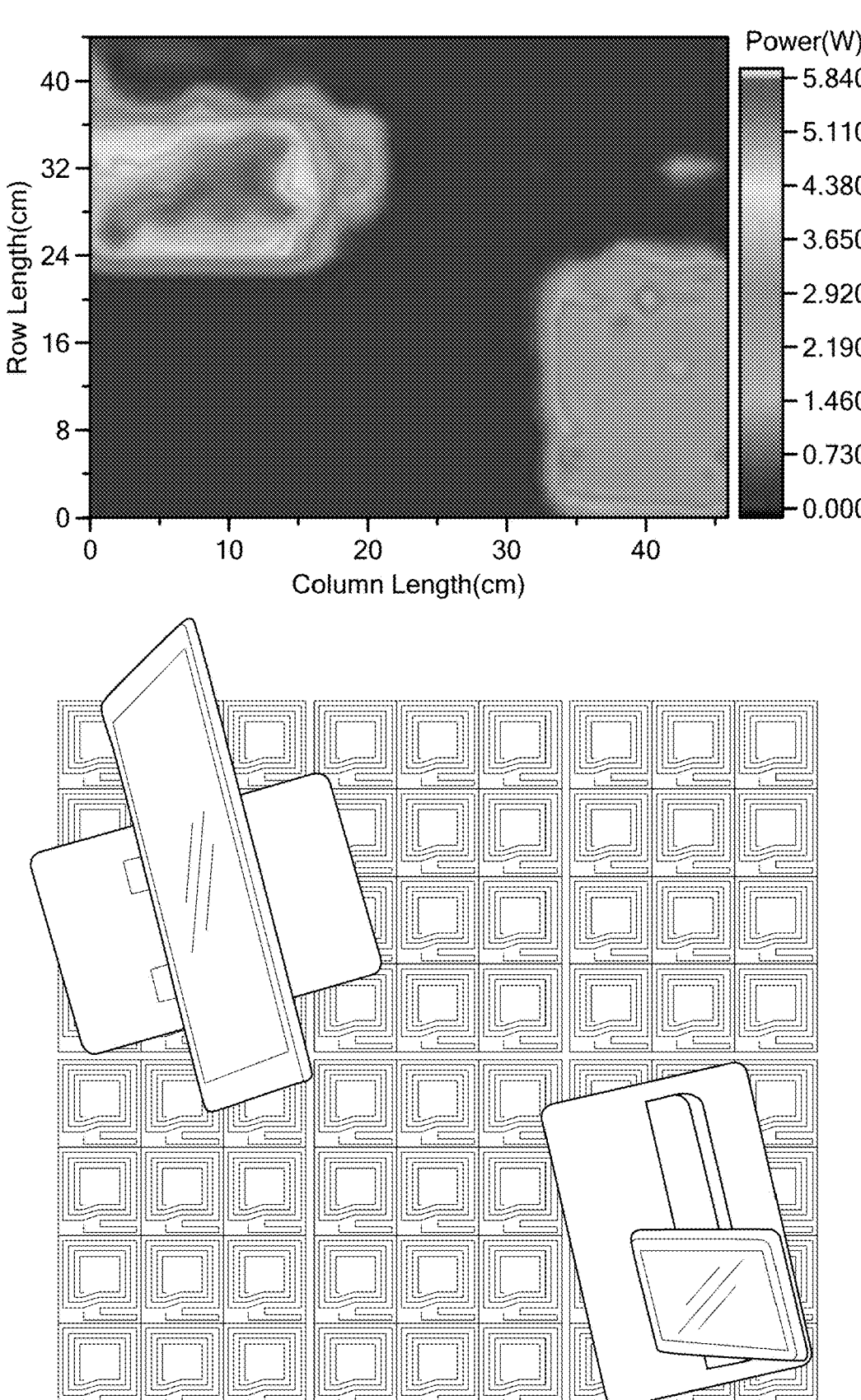
FIGS. 11B-11D illustrate experimental setups for tablet and phone charging at different locations on an intelligent surface and corresponding power distribution pattern results associated therewith.
Figure 11C:
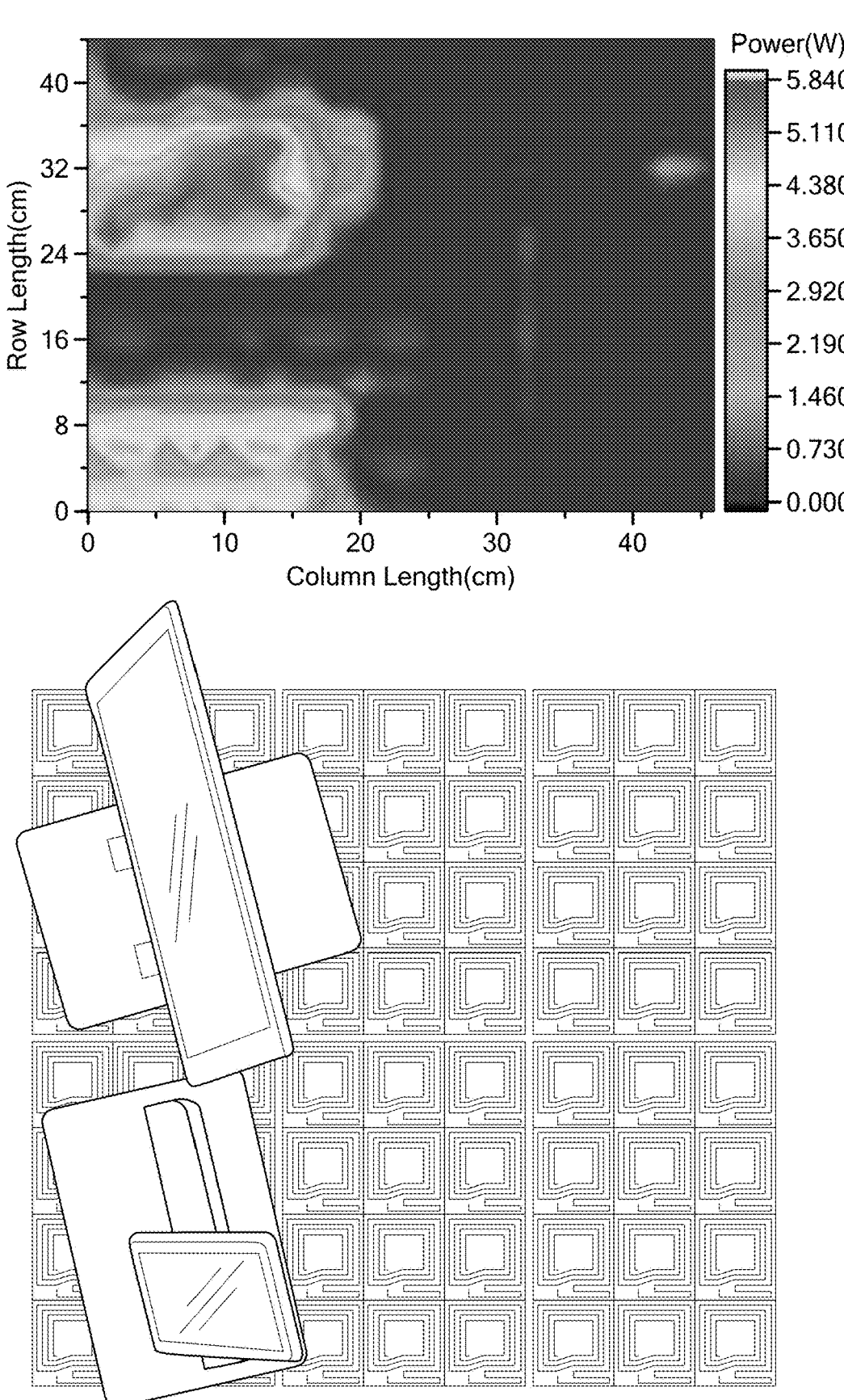
Figure 11D:
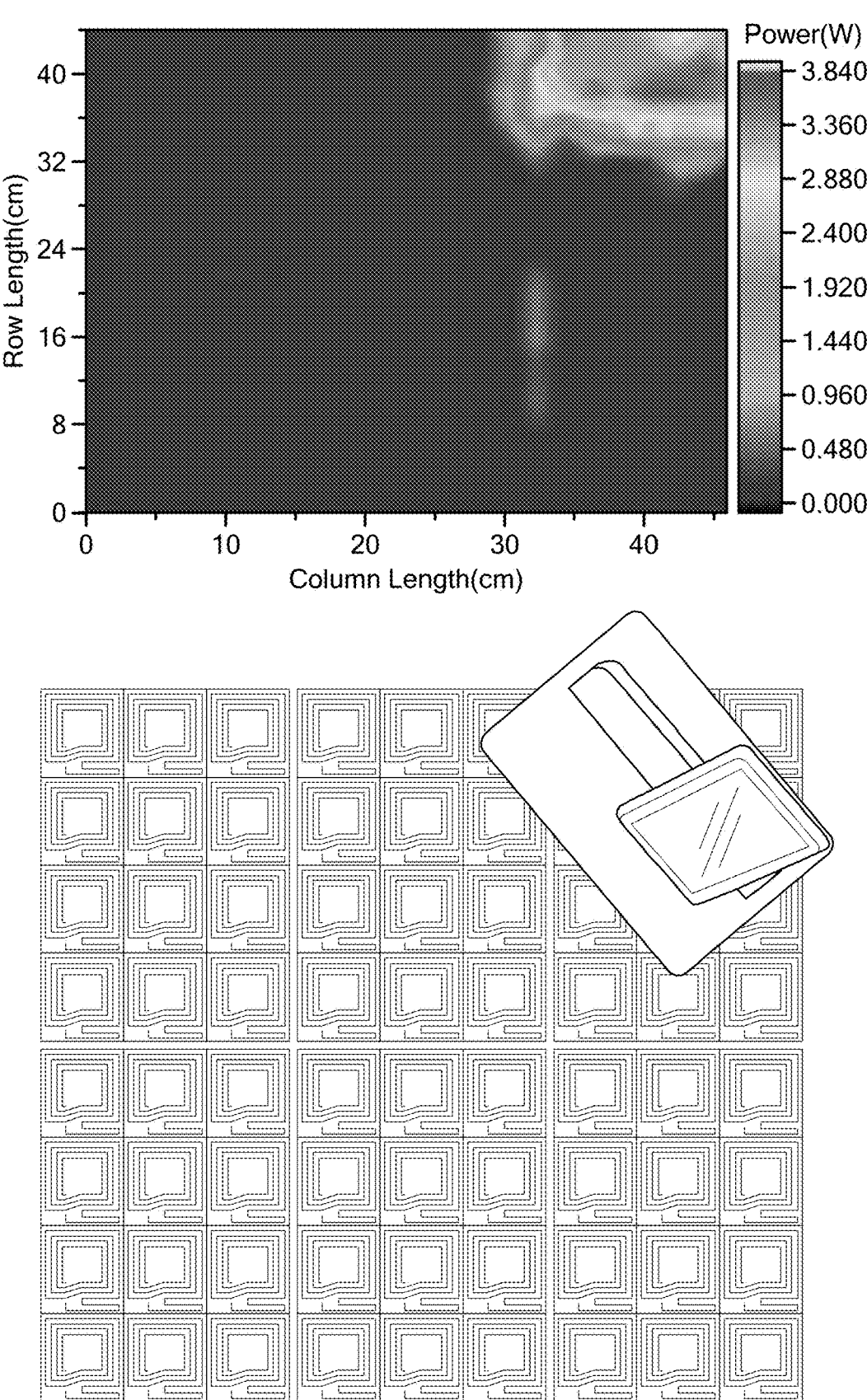

D. Exemplary Applications for Meta-Resonant Intelligent Surface Wireless Power Transfer System The validation results so far indicate the benefits of meta-resonant intelligent surface wireless power transfer systems, including customized energy patterns, amplification and blocking of power with enhanced human safety and end-to-end efficiency. Next, the usage of the meta-resonant intelligent surface wireless power transfer system for charging consumer electronics is explored, including, for example, devices such as a phone (iPhone) and tablet (iPad). Second, the charging performance of medical devices, such as blood pressure monitors, industrial tools that include power-tool battery packs, and a battery bank is demonstrated. The same experimental setup from the multiple meta-resonance unit experiments is used, as shown in FIGS. 11A-11D for iPad and iPhone charging. The receiver output voltage was updated to 5V and a high efficiency DC-DC converter was used to have a stable output. In addition, 3D printed enclosure stands were designed to enclose all electronic components, as shown in FIG. 11A. Placement of the iPad and iPhone with their stands at different locations and the corresponding experimentally observed energy patterns over the surface are presented in FIGS. 11B-11D. In the first configuration, the iPad receives up to 5.2 W power and phone receives about 2.9 W power in real time. In the second configuration, iPad gets around 5.5 W received power, and phone gets 3.6 W. Finally, in the third configuration, the iPhone gets 3.6 W power.

Figure 12A:
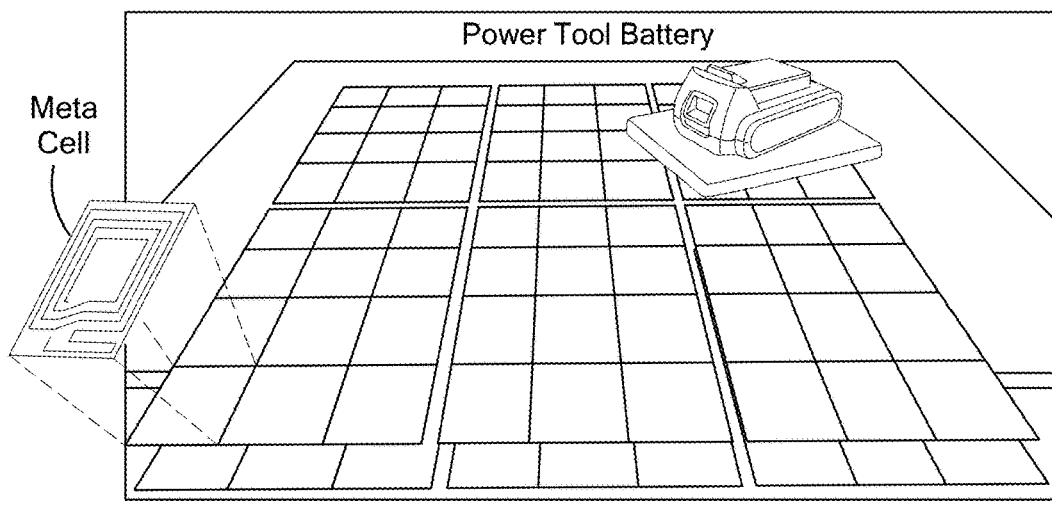
FIGS. 12A-12E illustrate an intelligent surface wireless power transfer system application charging different types of devices, including a power-tool battery, a blood pressure monitor, and a battery bank.
Figure 12B:
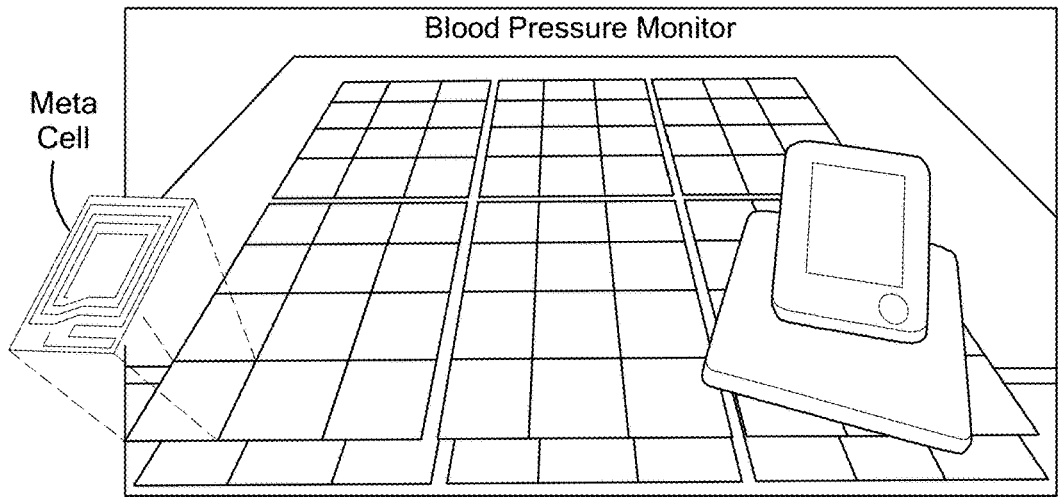
Figure 12C:
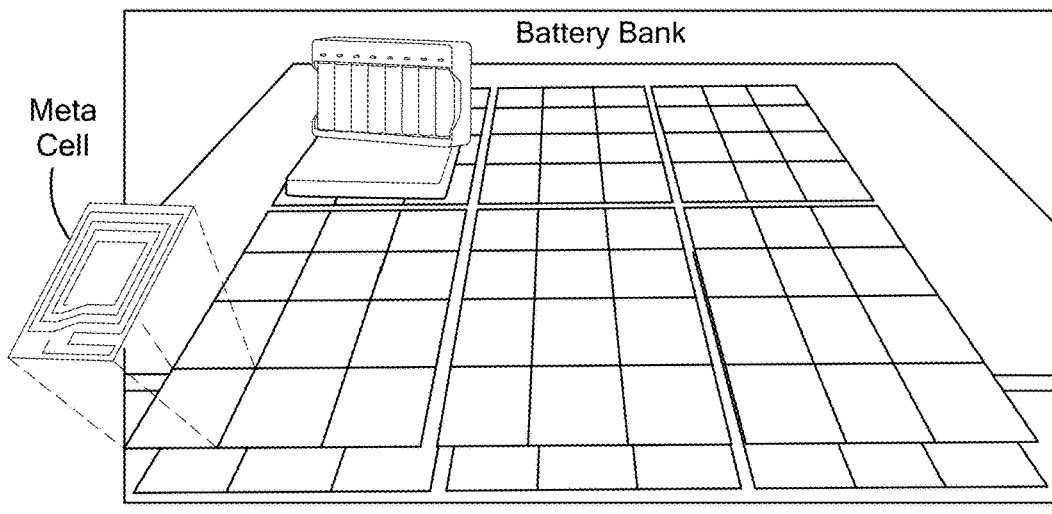
Figure 12D:
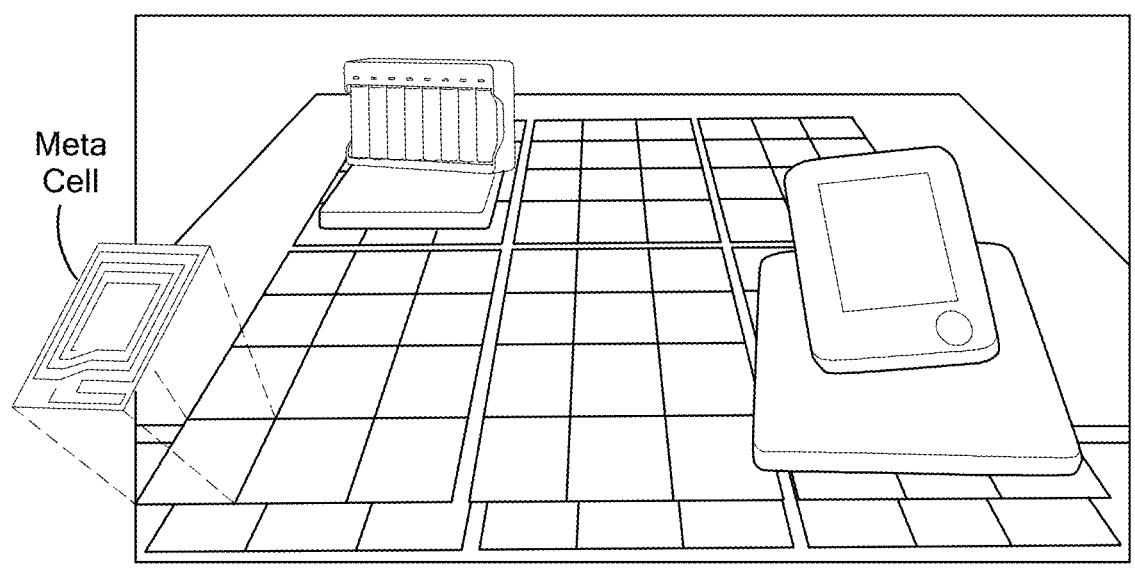
Figure 12E:
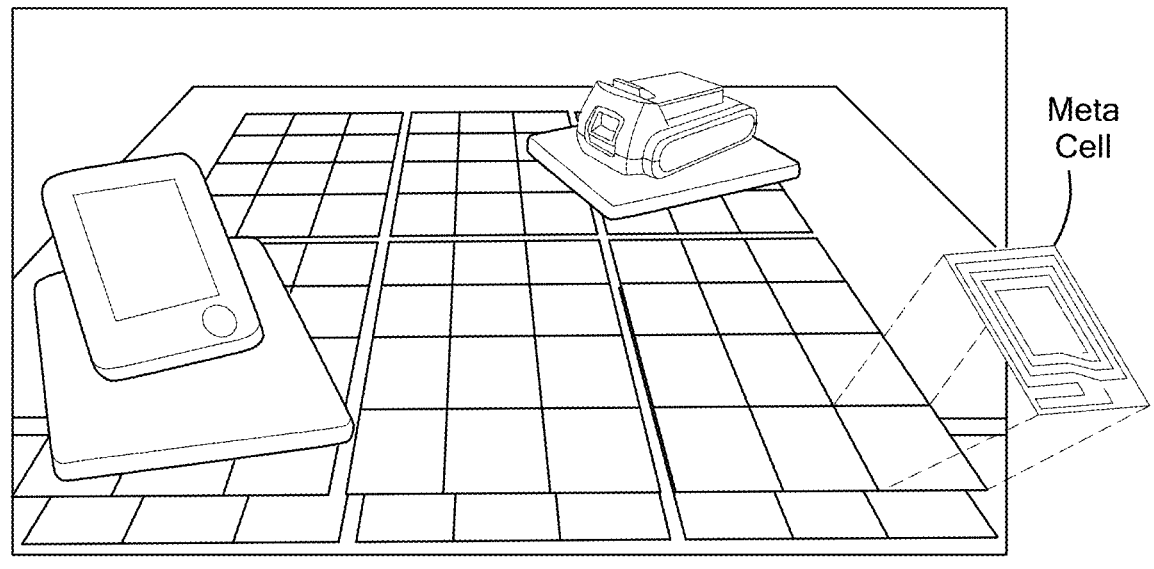

The proposed meta-resonant intelligent surface wireless power transfer system is not limited to only these example consumer electronics devices. Rather it can be used for a wide range of wireless charging applications. For example, as shown in FIGS. 12A-12E, devices such as industrial tools (e.g., batteries for power-tools), medical devices (e.g., blood pressure monitors), and different sized battery banks, to name a few. Each device can be placed at random positions on the charging surface (see examples shown in FIGS. 12A-12E). As before, only the area under the devices deliver power and charge the devices. The rest of the areas are blocked via the meta-surface layer. FIGS. 12E and 12D demonstrate the possibility of simultaneous multi-device surface charging of the blood pressure monitor and battery packs.

Features

The meta-resonant intelligent surface wireless power transfer system described herein represents a first-of-its-kind fully reconfigurable surface for wireless power transfer system. This system is extensively tested, including demonstration of many practical use-cases involving consumer electronics, industrial tools, and medical devices. The meta-resonant intelligent surface wireless power transfer system is capable of creating customizable power patterns with fine granularity by reshaping the power distribution over the layer of transmitter coils. Results demonstrate highly tuned wireless power patterns are possible with different and controllable configurations of the meta-resonance layer. In addition, results show that the meta-resonance layer addresses the concerns of human safety, while increasing the end-to-end power transfer efficiency up to 92.8%

Thus, as described herein, meta-resonant intelligent surfaces advantageously facilitate the creation of fully customizable power patterns with extreme fine granularity over large surfaces via software-based control, a dual-layer wireless surface charging design featuring (i) energy hopping for power distribution at the power distribution layer and (ii) an array of configurable meta-cell coils at the top, and the ability to charge different types of devices on-demand. Furthermore, the described design facilitates human safety by providing highly safe surface charging by configurable blocking of power anywhere on the surface as well as high end-to-end efficiency via highly efficient wireless distribution and delivery over the large surface by beamforming and blocking power while also providing High power charging.

The invention claimed is:

1. A programmable intelligent surface (PIS) for transmitting power and/or signals to a device positioned on or proximate the PIS, the PIS comprising:

at least one resonant unit including:

a power distribution layer having at least one transmitter coil configured to be energized by a power source and generate an electromagnetic field sized to electrically interact with one or more meta-cell coils of a meta-resonance layer; and the meta-resonance layer extending over the power distribution layer and comprising an array of configurable meta-cells, each including at least one of the meta-cell coils configured to selectively amplify, block, modify, or pass unchanged the electromagnetic field generated by the at least one transmitter coil.

2. The PIS of claim 1, wherein the array of configurable meta-cells includes an 8×9 grid of configurable meta-cells.

3. The PIS of claim 1, further comprising an array including a plurality of resonant units.

4. The PIS of claim 3, wherein the power distribution layer of one of the plurality of resonant units is directly energized by the power source and the power distribution layer of each other one of the resonant units is energized by energy hopping between the at least one transmitter coils.

5. The PIS of claim 4, wherein the energy hopping includes at least one of induction based hopping, magnetic resonant hopping, or wire connection.

6. The PIS of claim 3, wherein the array is a 3×4 grid of resonant units.

7. The PIS of claim 1, wherein each configurable meta-cell of the array of configurable meta-cells is spaced apart by a distance sufficient to reduce magnetic interference between adjoining configurable meta-cells.

8. The PIS of claim 7, wherein the configurable meta-cells are spaced apart by at least 0.5 cm.

9. The PIS of claim 1, further comprising a single-ended primary-inductor converter (SEPIC) pre-regulator electrically connected between the power source and the power distribution layer.

10. The PIS of claim 1, further comprising an amplifier electrically connected between the power source and the power distribution layer.

11. The PIS of claim 1, further comprising an impedance-matching network electrically connected between the power source and the power distribution layer.

12. The PIS of claim 1, wherein in the meta-resonance layer each configurable meta-cell is connected to at least one capacitor bank and a multi-layer power relay network configured to vary an impedance of each respective configurable meta-cell.

13. The PIS of claim 12, wherein the multi-layer power relay network includes a plurality of single-pole single-throw solid-state relays.

14. The PIS of claim 13, wherein the meta-resonance layer includes a microcontroller for controlling the configurable meta-cells, the capacitor banks, and the multi-layer power relay network.

15. The PIS of claim 1, wherein the meta-resonance layer includes at least one additional array of configurable meta-cells extending over the array of configurable meta-cells, each configurable meta-cell of the at least one additional array of configurable meta-cells including at least one additional meta-cell coil configured to selectively amplify, block, modify, or pass unchanged the electromagnetic field generated by the transmitter coil.

16. The PIS of claim 15, wherein the at least one additional meta-cell coil has at least one of a different size or a different shape than the at least one meta-cell coil of the array of configurable meta-cells.

17. The PIS of claim 1, further comprising at least one additional meta-resonance layer, the at least one additional meta-resonance layer comprising an additional array of configurable meta-cells, each including at least one additional meta-cell coil configured to selectively amplify, block, modify, or pass unchanged the electromagnetic field generated by the transmitter coil.

18. The PIS of claim 17, wherein the at least one additional meta-cell coil of the at least one additional meta-resonance layer has at least one of a different size or a different shape than the at least one meta-cell coil of the array of configurable meta-cells.

19. The PIS of claim 1, further comprising at least one additional power distribution layer, the at least one additional power distribution layer including at least one additional transmitter coil configured to be energized by the power source or an additional power source and to generate an additional electromagnetic field.

20. The PIS of claim 19, wherein the at least one additional transmitter coil has at least one of a different size or a different shape than the at least one transmitter coil of the power distribution layer.

21. The PIS of claim 1, wherein each configurable meta-cell is a power cavity resonator.

\* \* \* \* \*